(12) United States Patent
Mahgerefteh et al.

(10) Patent No.: US 7,809,280 B2
(45) Date of Patent: Oct. 5, 2010

(54) CHIRP-MANAGED, ELECTROABSORPTION-MODULATED LASER

(75) Inventors: Daniel Mahgerefteh, Somerville, MA (US); Yasuhiro Matsui, Lawrence, MA (US); Xueyan Zheng, Andover, MA (US); Bart Johnson, North Andover, MA (US); Duncan J W Walker, Walton-on Thames (GB); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 511 days.

(21) Appl. No.: 11/894,477

(22) Filed: Aug. 21, 2007

(65) Prior Publication Data
US 2008/0193143 A1    Aug. 14, 2008

Related U.S. Application Data

(63) Continuation-in-part of application No. 11/272,100, filed on Nov. 8, 2005, now Pat. No. 7,477,851, and a continuation-in-part of application No. 10/308,522, filed on Dec. 3, 2002, now Pat. No. 7,663,762, and a continuation-in-part of application No. 11/441,944, filed on May 26, 2006, now Pat. No. 7,492,976, and a continuation-in-part of application No. 11/068,032, filed on Feb. 28, 2005, now Pat. No. 7,555,225, and a continuation-in-part of application No. 11/084,630, filed on Mar. 18, 2005, now Pat. No. 7,406,266.

(60) Provisional application No. 60/853,867, filed on Oct. 24, 2006, provisional application No. 60/838,985, filed on Aug. 21, 2006.

(51) Int. Cl.
*H04B 10/04* (2006.01)

(52) U.S. Cl. .................. 398/185; 398/183; 398/186; 398/188; 398/193; 398/199

(58) Field of Classification Search ............... 398/199, 398/183, 185–189, 193, 201
See application file for complete search history.

(56) References Cited

U.S. PATENT DOCUMENTS 3,324,295 A    6/1967   Harris (Continued)

FOREIGN PATENT DOCUMENTS

GB        2 107 147        4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Leslie Pascal
(74) *Attorney, Agent, or Firm*—Workman Nydegger

(57) ABSTRACT

An optical transmitter comprising:
an optical source modulated with an input digital data signal so as to generate a first, frequency-modulated digital signal; and
an amplitude modulator, modulated with the logical inverse of the input digital data signal, for receiving the first, frequency-modulated signal and generating a second, amplitude-modulated and frequency-modulated digital signal;
wherein the optical source and the amplitude modulator are each configured so as to produce positive transient chirp.

A method for transmitting a signal, the method comprising:
generating a first, frequency-modulated digital signal by modulating an optical source with an input digital data signal; and
providing a second, amplitude-modulated and frequency-modulated digital signal by passing the first, frequency-modulated digital signal through an amplitude modulator while modulating the amplitude modulator with the logical inverse of the input digital data signal;
wherein the optical source and the amplitude modulator are each configured so as to produce positive transient chirp.

18 Claims, 32 Drawing Sheets

A chirp managed electro-absorption modulator laser, showing that a digital data signal and its logical inverse are used to modulate the laser section as well as the electro-absorption sections.

U.S. PATENT DOCUMENTS

| | | | |
|---|---|---|---|
| 3,999,105 A | 12/1976 | Archey et al. |
| 4,038,600 A | 7/1977 | Thomas et al. |
| 4,561,119 A | 12/1985 | Epworth |
| 4,805,235 A | 2/1989 | Henmi |
| 4,841,519 A | 6/1989 | Nishio |
| 5,293,545 A | 3/1994 | Huber |
| 5,325,378 A | 6/1994 | Zorabedian |
| 5,371,625 A | 12/1994 | Wedding et al. |
| 5,412,474 A | 5/1995 | Reasenberg et al. |
| 5,416,629 A | 5/1995 | Huber |
| 5,465,264 A | 11/1995 | Buhler et al. |
| 5,477,368 A | 12/1995 | Eskildsen et al. |
| 5,550,667 A | 8/1996 | Krimmel et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 | 10/2002 | Roberts et al. |
| 6,506,342 B1 | 1/2003 | Frankel |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg et al. |
| 6,748,133 B2 | 6/2004 | Liu et al. |
| 6,778,307 B2 | 8/2004 | Clark |
| 6,810,047 B2 | 10/2004 | Oh et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2003/0231677 A1* | 12/2003 | Amparan et al. ......... 372/38.02 |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029395 A1* | 2/2006 | Kim et al. ................ 398/183 |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in MicroRing Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

* cited by examiner

Figure 1. An optical digital signal with concomitant amplitude modulation and frequency modulation (flat-topped chirp).

Figure 2. Instantaneous frequency and phase of a 101 bit sequence for flat-topped chirp values of 5 GHz and 10 GHz for a 10 Gb/s digital signal Figure 3. A 101 bit sequence with and without flat-topped chirp before and after propagation.

Figure 4. Gaussian pulse with adiabatic chirp profile before an OSR and resulting pulse shape and flat topped chirp after an OSR.

Figure 5. Instantaneous frequency profile of the pulse and definitions

Figure 7. Instantaneous frequency profile and intensity profile after an OSR with two different slopes.

Figure 8. Optical spectrum of an adiabatically chirped signal, the spectrum of the OSR, and the resulting reshaped spectrum.

Figure 9. Receiver sensitivity after 200 km of 17 ps/nm/km fiber for various values of adiabatic chirp, and spectral shift of signal relative to the OSR, which in this example is a 3 cavity etalon filter.

Figure 10. An example of a non-Gaussian OSR and spectral position of signal relative to the OSR spectrum.

Figure 11. Definition of Slope of slope on an OSR

Figure 12. Bessel filters used as OSR provide the desired slope of slope.

Figure 13. Optical and electrical eye diagrams before and after transmission through 200 km (3400 ps/nm) of fiber.

Figure 14. Eye diagrams for back-back and after 200 km of fiber for a chirp managed laser (CML™) transmitter with transient chirp at the output of the laser Figure 15. Measured slope and slope of slope for a 2 cavity etalon.

Figure 16. Transmission and slope of an edge filter used as an OSR

Figure 17. Example of an OSR with its dispersion profile.

Figure 18. Sensitivity versus fiber length of dispersion 17 ps/nm/km with and without dispersion of the OSR taken into account.

Figure 19. FM optical source with a DFB FM modulator and separate amplitude modulator.

Figure 20. FM optical source with a modulated DFB and integrated Electro-absorption modulator.

Figure 21. Temporal profiles of the AM and FM signals.

Figure22. Optical FM/AM source and bandwidth limiting OSR or filter.

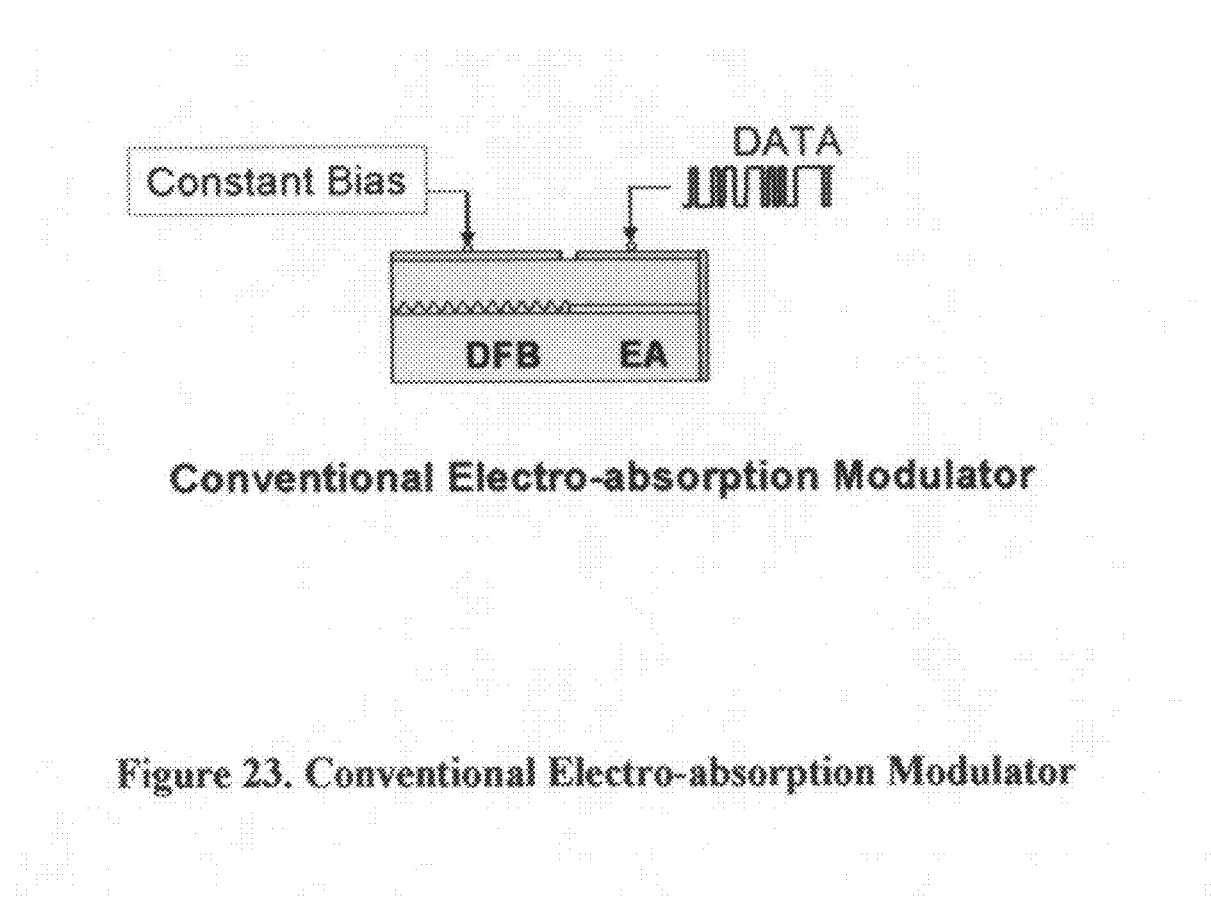
Figure 23. Conventional Electro-absorption Modulator

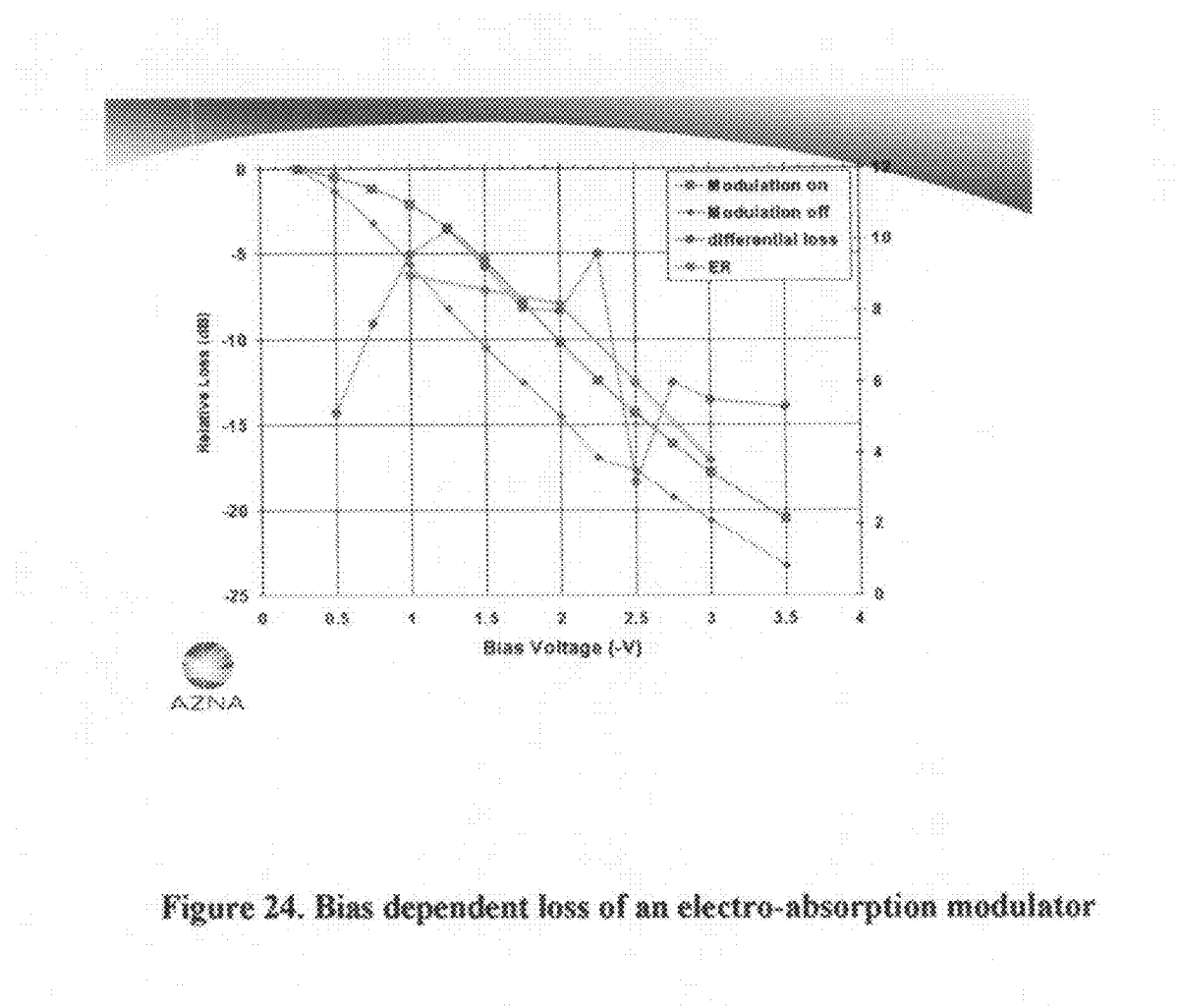
Figure 24. Bias dependent loss of an electro-absorption modulator

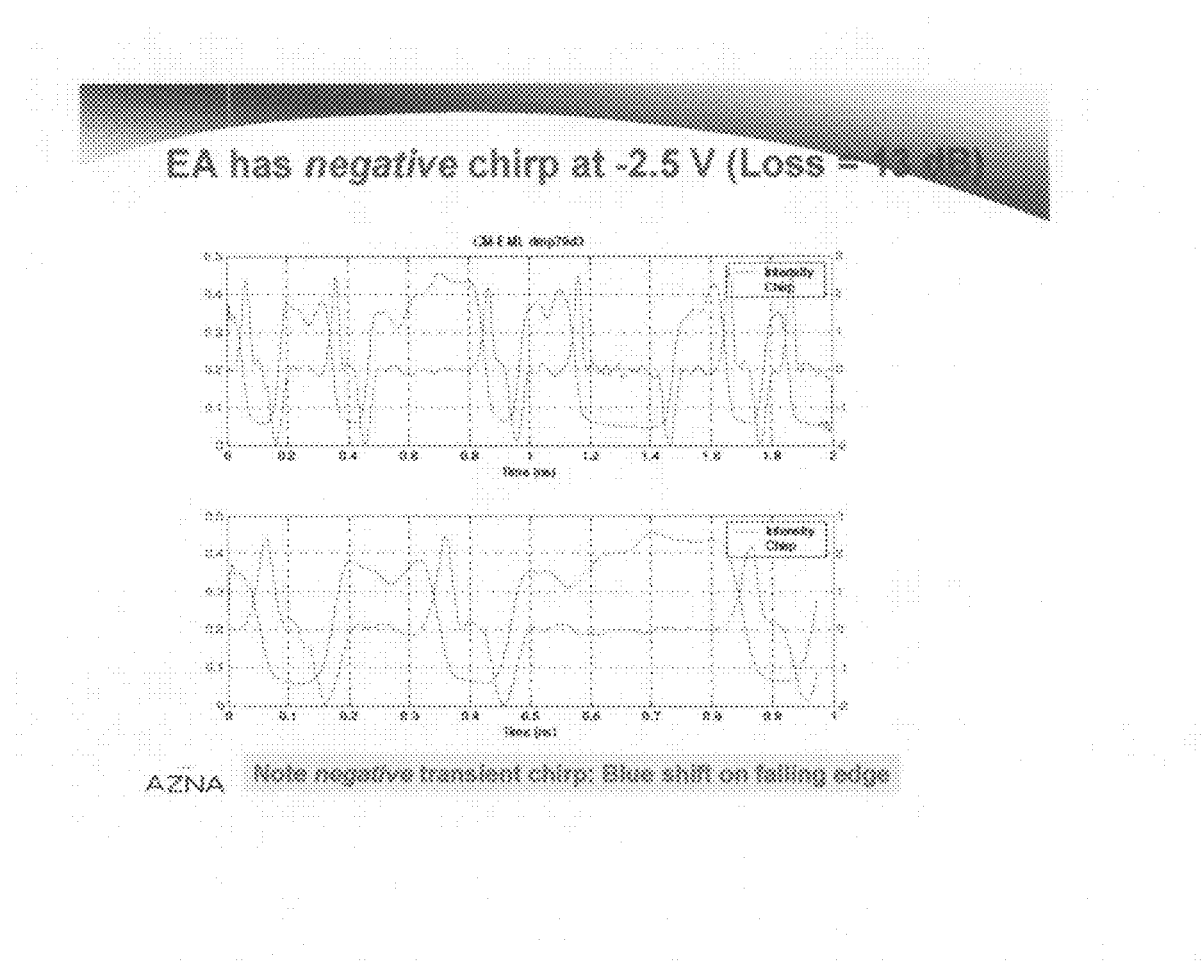
Figure 25. Time resolved frequency profile (chirp) of a conventional EA modulator at a bias voltage optimized for transmission through positive dispersion fiber.

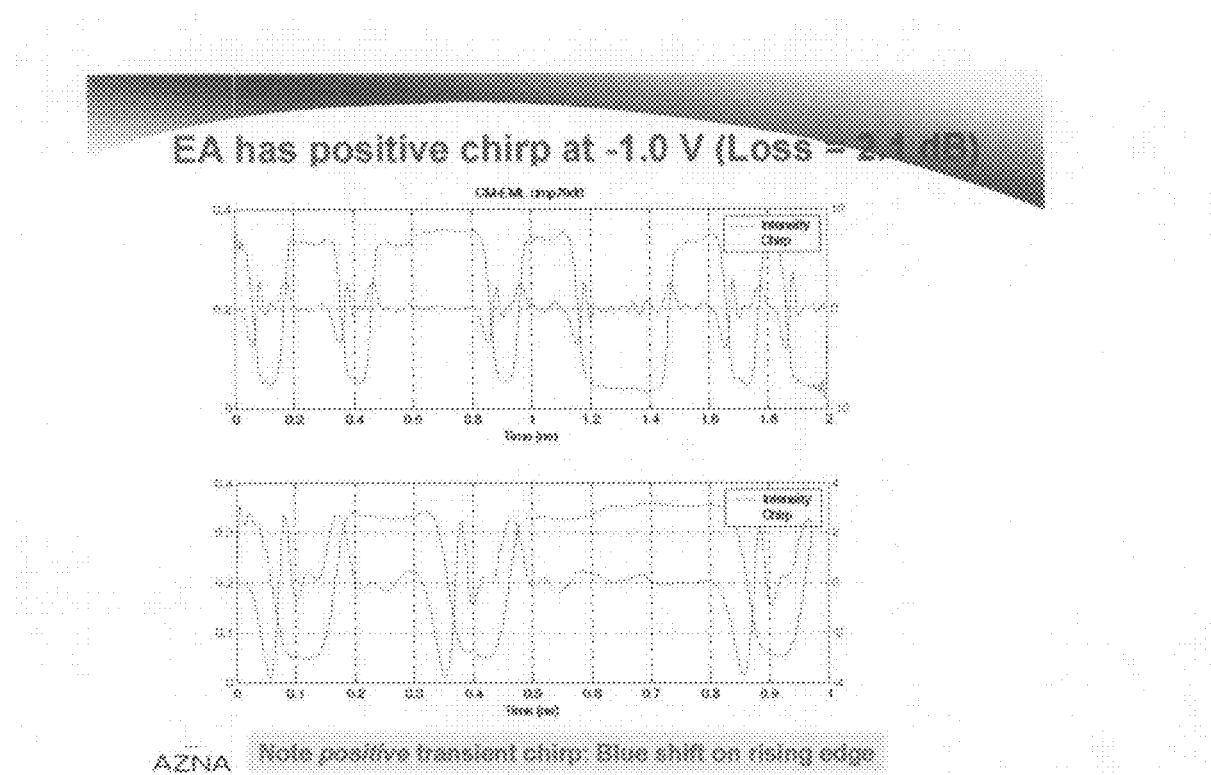
Figure 26. Time resolved frequency profile (chirp) of a conventional EA modulator at a bias voltage optimized for low loss.

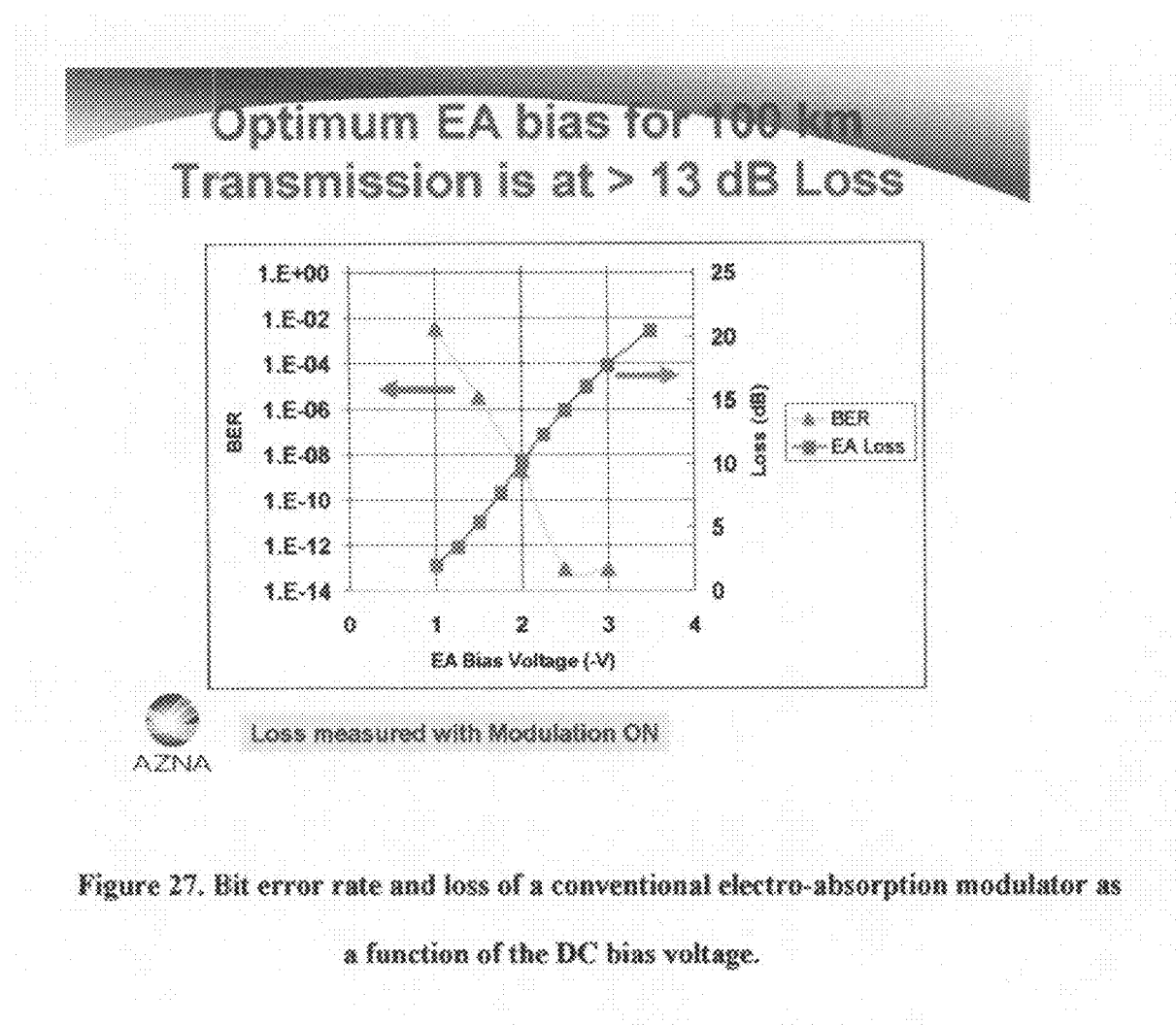
Figure 27. Bit error rate and loss of a conventional electro-absorption modulator as a function of the DC bias voltage.

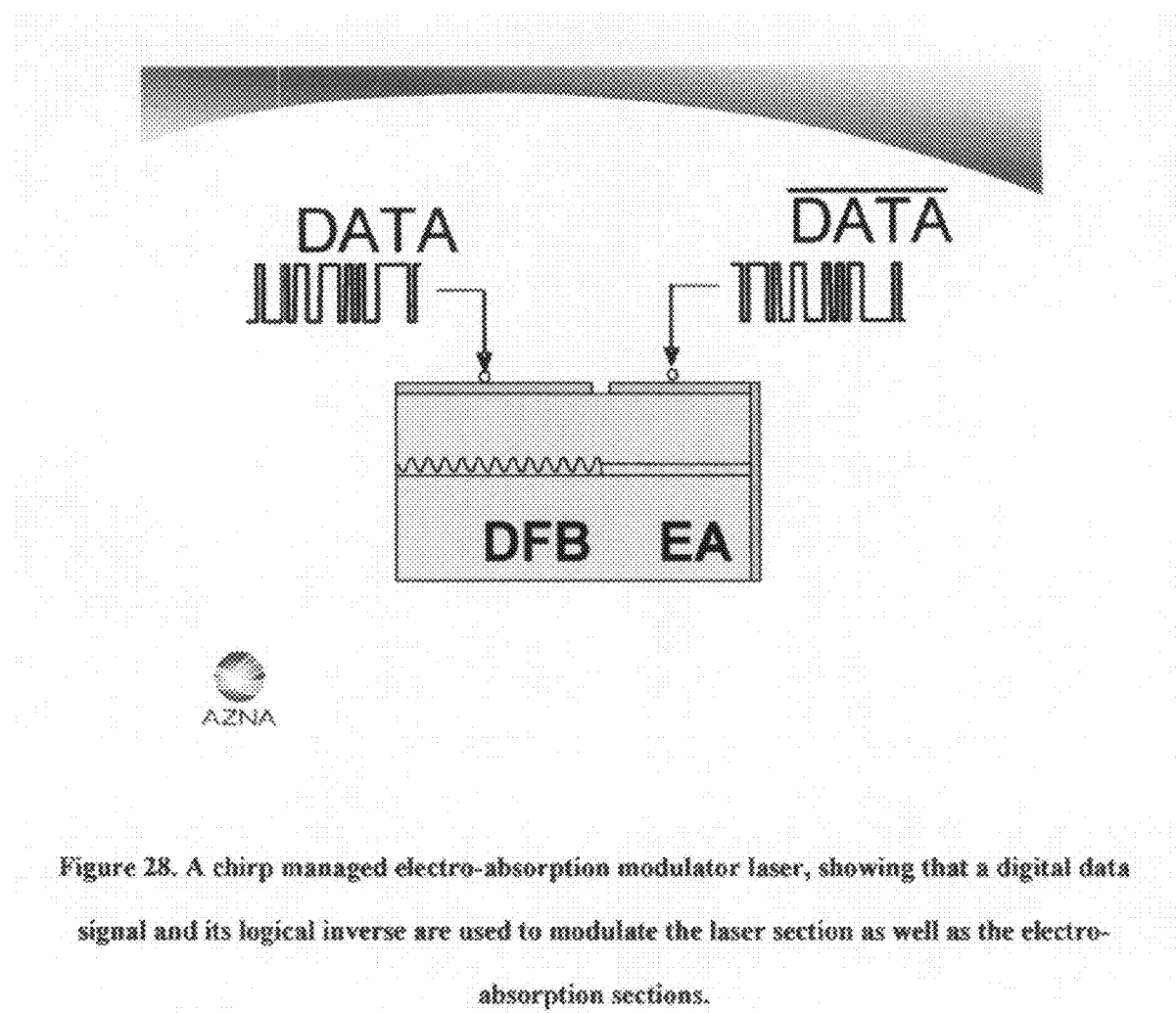
Figure 28. A chirp managed electro-absorption modulator laser, showing that a digital data signal and its logical inverse are used to modulate the laser section as well as the electro-absorption sections.

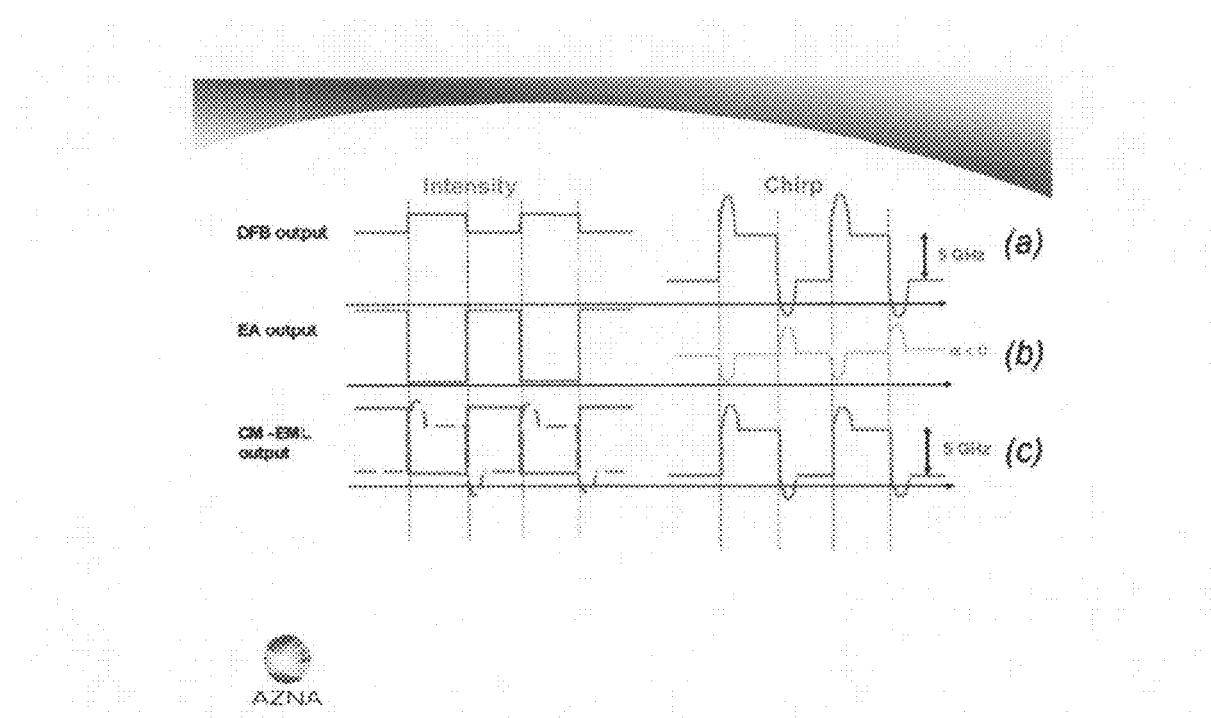
Figure 29. Output intensity and chirp (a) after a modulated DFB, (b) after a modulated EA, (c) after an integrated chirp managed electro-absorption modulator laser, where both DFB and EA are modulated.

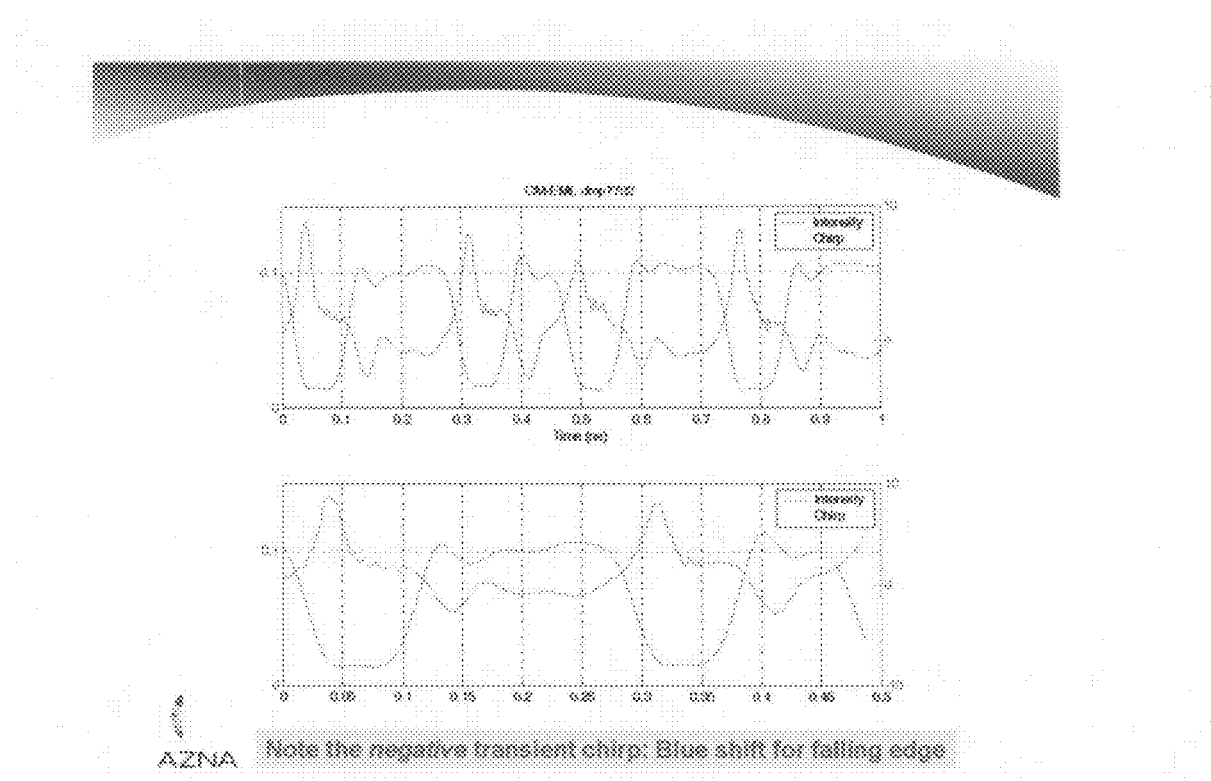
Figure 30. Intensity and chirp of the output of a synchronously modulated DFB, EA tandem.

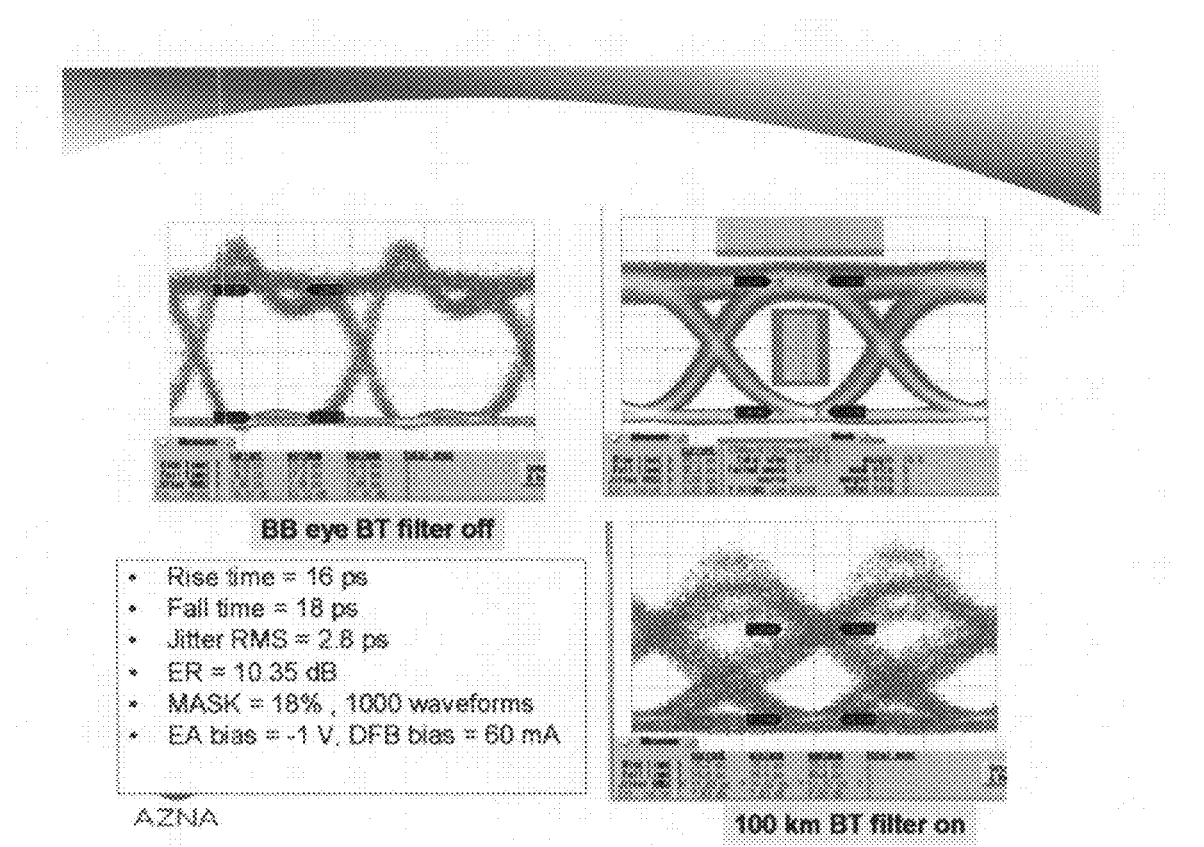
Figure 31. Optical eye diagrams before and after 100 km of fiber for a chirp managed electro-absorption modulator.

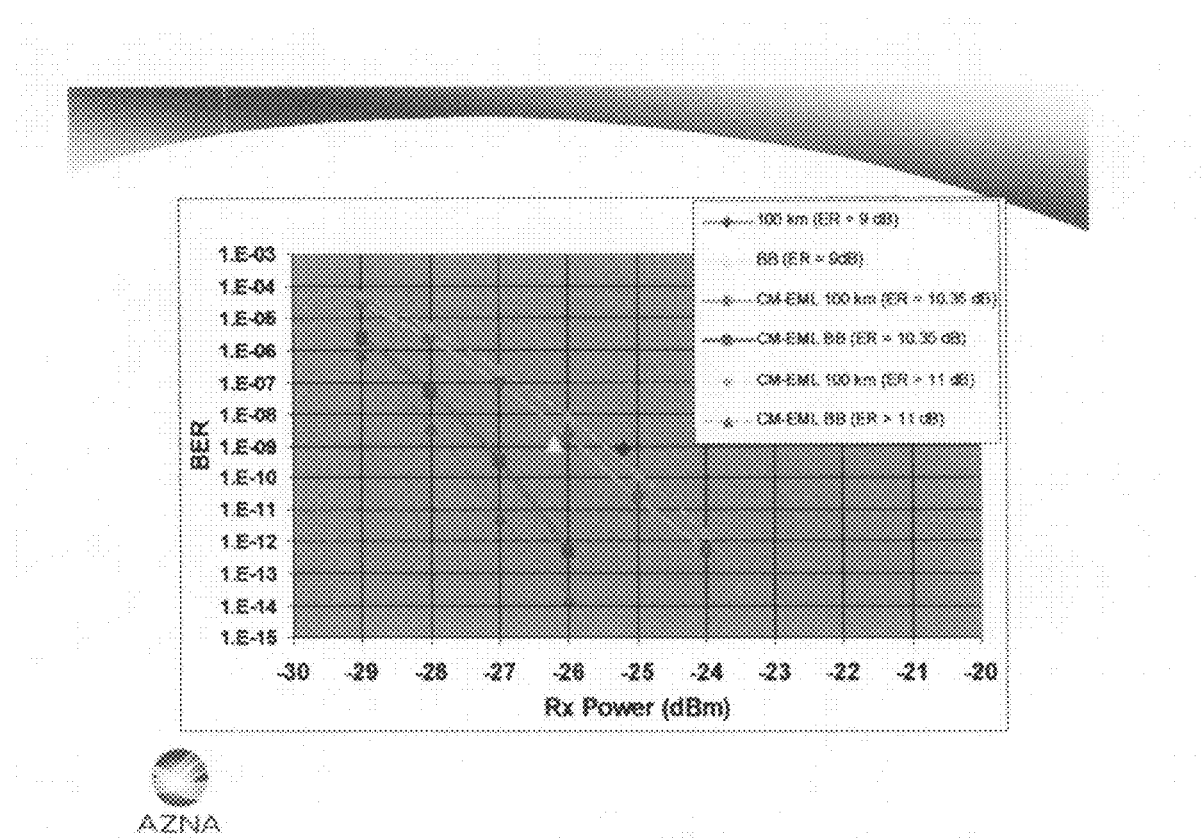
Figure 32. BER performance of a chirp managed electro-absorption modulator.

CHIRP-MANAGED, ELECTROABSORPTION-MODULATED LASER

REFERENCE TO PENDING PRIOR PATENT APPLICATIONS

This patent application:

(i) is a continuation-in-part of prior U.S. patent application Ser. No. 11/272,100, filed Nov. 8, 2005 now U.S. Pat. No. 7,477,851 by Daniel Mahgerefteh et al. for POWER SOURCE FOR A DISPERSION COMPENSATION FIBER OPTIC SYSTEM;

(ii) is a continuation-in-part of prior U.S. patent application Ser. No. 10/308,522, filed Dec. 3, 2002 now U.S. Pat. No. 7,663,762 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 11/441,944, filed May 26, 2006 now U.S. Pat. No. 7,492,976 by Daniel Mahgerefteh et al. for FLAT DISPERSION FREQUENCY DISCRIMINATOR (FDFD);

(iv) is a continuation-in-part of prior U.S. patent application Ser. No. 11/068,032, filed Feb. 28, 2005 now U.S. Pat. No. 7,555,525 by Daniel Mahgerefteh et al. for OPTICAL SYSTEM COMPRISING AN FM SOURCE AND A SPECTRAL RESHAPING ELEMENT;

(v) is a continuation-in-part of prior U.S. patent application Ser. No. 11/084,630, filed Mar. 18, 2005 now U.S. Pat. No. 7,406,266 by Daniel Mahgerefteh et al. for FLAT-TOPPED CHIRP INDUCED BY OPTICAL FILTER EDGE;

(vi) claims benefit of pending prior U.S. Provisional Patent Application Ser. No. 60/853,867, filed Oct. 24, 2006 by Kevin McCallion et al. for SPECTRAL RESPONSE MODIFICATION VIA SPATIAL FILTERING WITH OPTICAL FIBER; and (vii) claims benefit of pending prior U.S. Provisional Patent Application Ser. No. 60/838,985, filed Aug. 21, 2006 by Daniel Mahgerefteh et al. for CHIRP MANAGED ELECTRO-ABSORPTION MODULATED LASER.

The seven (7) above-identified patent applications are hereby incorporated herein by reference.

FIELD OF THE INVENTION

This invention relates to signal transmissions in general, and more particularly to the transmission of optical signals and electrical signals.

BACKGROUND OF THE INVENTION

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference in sensitivity at the output of the transmitter with the sensitivity after propagation is called dispersion penalty. This is typically characterized the distance over which a dispersion penalty reaches a level of ~1 dB. A standard 10 Gb/s optical digital transmitter, such as an externally modulated source can transmit up to a distance of ~50 km in standard single mode fiber at 1550 nm before the dispersion penalty reaches the level of ~1 dB, called the dispersion limit. The dispersion limit is determined by the fundamental assumption that the digital signal is transform limited, i.e. the signal has no time varying phase across its bits and has a bit period of 100 ps, or 1/(bit rate). Another measure of the quality of a transmitter is the absolute sensitivity after fiber propagation.

Three types of optical transmitters are presently in use in prior art fiber optic systems: (i) directly modulated laser (DML), (ii) Electroabsorption Modulated Laser (EML), and (iii) Externally Modulated Mach Zhender (MZ). For transmission in standard single mode fiber at 10 Gb/s, and 1550 nm, it has generally been assumed that MZ modulators and EMLs can have the longest reach, typically reaching 80 km. Using a special coding scheme, referred to as phase shaped duobinary, MZ transmitters can reach 200 km. On the other hand, directly modulated lasers (DML) reach <5 km because their inherent time dependent chirp causes severe distortion of the signal after this distance.

By way of example, various systems for long-reach lightwave data transmission (>80 km at 10 Gb/s) through optical fibers which increase the reach of DMLs to >80 km at 10 Gb/s in single mode fiber are disclosed in (i) U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM; (ii) U.S. patent application Ser. No. 11/441,944, filed May 26, 2006 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference. The transmitter associated with these novel systems is sometimes referred to as a Chirp Managed Laser (CML)™ by Azna LLC/Finisar Corportaion of Wilmington, Mass. In these new systems, a Frequency Modulated (AFM) source is followed by an Optical Spectrum Reshaper (OSR) which uses the frequency modulation to increase the amplitude modulated signal and partially compensate for dispersion in the transmission fiber. In one embodiment, the frequency modulated source may comprise a Directly Modulated Laser (DML). The Optical Spectrum Reshaper (OSR), sometimes referred to as a frequency discriminator, can be formed by an appropriate optical element that has a wavelength-dependent transmission function. The OSR can be adapted to convert frequency modulation to amplitude modulation.

In the novel system of the present invention, the chirp properties of the frequency modulated source are separately adapted and then further reshaped by configuring the OSR to further extend the reach of a CML™ transmitter to over 250 km on standard single mode fiber at 10 Gb/s and 1550 nm. The novel system of the present invention combines, among other things, selected features of systems described in (i) U.S. patent application Ser. No. 11/068,032, filed Feb. 28, 2005 by Daniel Mahgerefteh et al. for entitled OPTICAL SYSTEM COMPRISING AN FM SOURCE AND A SPECTRAL RESHAPING ELEMENT; and (ii) U.S. patent application Ser. No. 11/084,630, filed Mar. 18, 2005 by Daniel Mahgerefteh et al. for FLAT-TOPPED CHIRP INDUCED BY OPTICAL FILTER EDGE, which patent applications are hereby incorporated herein by reference.

SUMMARY OF THE INVENTION

This invention provides an optical spectrum reshaper (OSR) which works in tandem with a modulated optical source which, by modifying the spectral properties of the modulated signal, results in extending the optical transmission length well beyond the dispersion limit. The OSR can be defined as a passive optical element that imparts an optical frequency dependent loss and frequency dependent phase on an input optical signal. This invention also provides a modulated laser source and an optical spectrum reshaper system that increases tolerance to fiber dispersion as well as converting a partially frequency modulated signal into a substantially amplitude modulated signal.

The optical spectrum reshaper (OSR) may be a variety of filters such as a Coupled Multicavity (CMC) filter to enhance the fidelity of converting a partially frequency modulated signal into a substantially amplitude modulated signal. The OSR may also partially compensate for the dispersion of the fiber. In one embodiment of the present invention, a modulated laser source may be provided that is communicatably coupled to an optical filter where the filter is adapted to lock the wavelength of a laser source as well as converting the partially frequency modulated laser signal into a substantially amplitude modulated signal.

In one form of the present invention, there is provided a fiber optic communication system comprising:

an optical signal source adapted to receive a base binary signal and produce a first signal, said first signal being frequency modulated; and an optical spectrum reshaper adapted to reshape the first signal into a second signal, said second signal being amplitude modulated and frequency modulated;

characterized in that:

the frequency characteristics of said first signal, and the optical characteristics of said optical spectrum reshaper, being such that the frequency characteristics of said second signal are configured so as to increase the tolerance of the second signal to dispersion in a transmission fiber.

In another form of the present invention, there is provided an optical transmitter comprising:

a frequency modulated source for generating a first frequency modulated signal, and an amplitude modulator for receiving the first frequency modulated signal and for generating a second amplitude and frequency modulated signal.

In another form of the present invention, there is provided a method for transmitting an optical signal through a transmission fiber comprising: receiving a base binary signal;

operating an optical signal source using the base binary signal to produce a first signal, said first signal being frequency modulated;

passing the frequency modulated signal through an optical spectrum reshaper so as to reshape the first signal into a second signal, said second signal being amplitude modulated and frequency modulated;

the frequency characteristics of said first signal, and the optical characteristics of said optical spectrum reshaper, being such that the frequency characteristics of said second signal are configured so as to increase the tolerance of the second signal to dispersion in a transmission fiber; and passing the second signal through a transmission fiber.

In another form of the present invention, there is provided a method for transmitting a base signal, comprising:

using the base signal to produce a frequency modulated signal; and providing an amplitude modulator for receiving the frequency modulated signal and for generating an amplitude and frequency modulated signal.

In another form of the present invention, there is provided a fiber optic communication system comprising:

an optical signal source adapted to produce a frequency modulated signal; and an optical spectrum reshaper adapted to convert the frequency modulated signal into a substantially amplitude modulated signal;

characterized in that:

the operating characteristics of the optical signal source and the optical characteristics of the optical spectrum reshaper combine to compensate for at least a portion of a dispersion in an optical fiber.

In another form of the present invention, there is provided a method for transmitting an amplitude modulated signal through a fiber comprising:

providing a laser and providing a filter having selected optical characteristics;

inputting the amplitude modulated signal into the laser, and operating the laser, so as to generate a corresponding frequency modulated signal;

passing the frequency modulated signal through the filter so as to generate a resulting signal and passing the resulting signal into the fiber;

the laser being operated, and the filter being chosen, such that the resulting signal is configured to compensate for at least a portion of the dispersion in the fiber.

In another form of the present invention, there is provided a fiber optic communication system comprising:

an optical signal source adapted to produce a first signal, said first signal being frequency modulated; and an optical spectrum reshaper adapted to convert said first signal into a second signal, said second signal being amplitude modulated and frequency modulated;

characterized in that:

the frequency characteristics of said first signal, and the optical characteristics of said optical spectrum reshaper, being such that the frequency characteristics of said second signal are configured so as to extend the distance said second signal can travel along a fiber before the amplitude characteristics of said second signal degrade beyond a given amount.

In another form of the present invention, there is provided a fiber optic communication system comprising:

a module adapted to receive a first signal and convert said first signal into a second signal, said second signal being amplitude modulated and frequency modulated;

characterized in that:

the frequency characteristics of said second signal are configured so as to extend the distance said second signal can travel along a fiber before the amplitude characteristics of said second signal degrade beyond a given amount.

In another form of the present invention, there is provided a system adapted to convert a first signal into a second signal, said second signal being amplitude modulated and frequency modulated;

the improvement comprising:

tailoring the frequency characteristics of said second signal so as to extend the distance said second signal can travel along a fiber before the amplitude characteristics of said second signal degrade beyond a given amount.

In another form of the present invention, there is provided a fiber optic communication system comprising:

an optical signal source adapted to receive a base signal and produce a first signal, said first signal being frequency modulated; and an optical spectrum reshaper adapted to convert said first signal into a second signal, said second signal being amplitude modulated and frequency modulated;

characterized in that:

the frequency characteristics of said first signal, and the optical characteristics of said optical spectrum reshaper, being such that the frequency characteristics of said second signal are configured so as to extend the distance said second signal can travel along a fiber before the amplitude characteristics of said second signal degrade beyond a given amount.

In another form of the present invention, there is provided a fiber optic communication system comprising:

an optical signal source adapted to produce a first signal, said first signal being frequency modulated; and an optical spectrum reshaper adapted to convert said first signal into a second signal, said second signal being amplitude modulated and frequency modulated;

characterized in that:

the frequency dependent loss of the optical spectrum reshaper is adjusted to increase the dispersion tolerance of the second signal.

In another form of the present invention, there is provided a fiber optic system comprising:

an optical source adapted to produce a frequency modulated digital signal;

characterized in that:

said digital signal has a time varying frequency modulation which is substantially constant across each 1 bit and equal to a first frequency and substantially constant over each 0 bit and equal to a second frequency, wherein the difference between said first frequency and said second frequency is between 0.2 times and 1.0 times the bit rate frequency.

In another form of the present invention, there is provided a method for generating a dispersion tolerant digital signal, comprising:

modulating a DFB laser with a first digital base signal to generate a first optical FM signal, wherein said first FM signal has a $\pi$ phase shift between 1 bits that are separated by an odd number of 0 bits, and modulating amplitude of said first optical FM signal with a second digital base signal to produce a second optical signal with high contrast ratio.

In still another form of the present invention, there is provided an optical transmitter comprising:

an optical source modulated with an input digital data signal so as to generate a first, frequency-modulated digital signal; and an amplitude modulator, modulated with the logical inverse of the input digital data signal, for receiving the first, frequency-modulated signal and generating a second, amplitude-modulated and frequency-modulated digital signal;

wherein the optical source and the amplitude modulator are each configured so as to produce positive transient chirp.

In yet another form of the present invention, there is provided a method for transmitting a signal, the method comprising:

generating a first, frequency-modulated digital signal by modulating an optical source with an input digital data signal; and providing a second, amplitude-modulated and frequency-modulated digital signal by passing the first, frequency-modulated digital signal through an amplitude modulator while modulating the amplitude modulator with the logical inverse of the input digital data signal;

wherein the optical source and the amplitude modulator are each configured so as to produce positive transient chirp.

BRIEF DESCRIPTION OF THE DRAWINGS

Many modifications, variations and combinations of the methods and systems and apparatus of a dispersion compensated optical filter are possible in light of the embodiments described herein. The description above and many other features and attendant advantages of the present invention will become apparent from a consideration of the following detailed description when considered in conjunction with the accompanying drawings wherein like numbers refer to like parts and further wherein:

FIG. 23 illustrates a conventional electroabsorption modulator transmitter;

FIG. 24 illustrates the bias-dependent loss of an electroabsorption modulator;

FIG. 25 illustrates the time resolved frequency profile (chirp) of a conventional EA modulator at a bias voltage optimized for transmission through positive dispersion fiber;

FIG. 26 illustrates the time resolved frequency profile (chirp) of a conventional EA modulator at a bias voltage optimized for low loss;

FIG. 27 illustrates the bit error rate and loss of a conventional electroabsorption modulator as a function of the DC bias voltage;

FIG. 28 illustrates a chirp-managed, electroabsorption-modulated laser, showing that a digital data signal, and its logical inverse, are used to modulate the laser section as well as the electroabsorption section;

FIG. 29 illustrates the output intensity and chirp (a) after a modulated DFB, (b) after a modulated EA, and (c) after an integrated chirp-managed, electroabsorption-modulated laser, where both the DFB and the EA are modulated;

FIG. 30 illustrates the intensity and chirp of the output of a synchronously-modulated tandem DFB/EA construction;

FIG. 31 illustrates optical eye diagrams before and after 100 km of fiber for a chirp-managed, electroabsorption-modulated transmitter; and FIG. 32 illustrates the BER performance of a chirp-managed, electroabsorption-modulated transmitter.

DETAILED DESCRIPTION OF THE PREFERRED EMBODIMENTS

In one embodiment of the present invention, the CML™ generates a digital optical signal having concomitant amplitude and frequency modulation, such that there is a special correlation between the optical phases of the bits. This phase correlation provides a high tolerance of the resulting optical signal to dispersion in the optical fiber, further extending the reach of the CML™.

Figure 1:
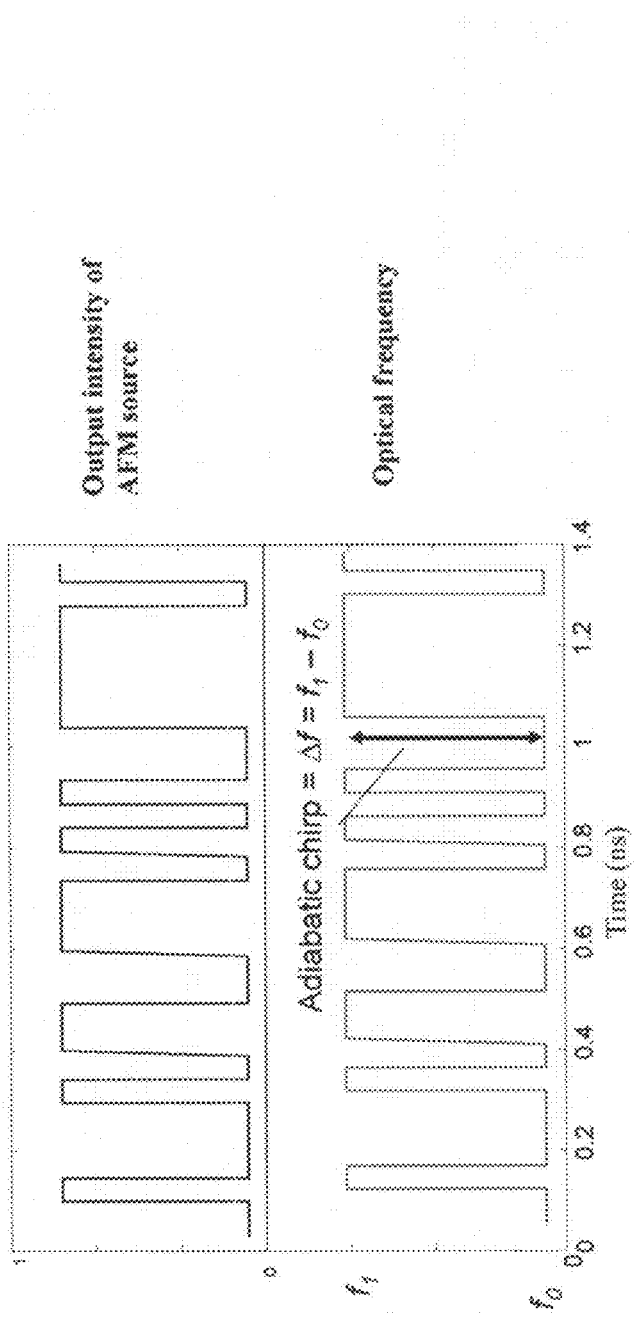
FIG. 1 illustrates an optical digital signal with concomitant amplitude modulation and frequency modulation (i.e., flat-topped chirp)
Figure 2:
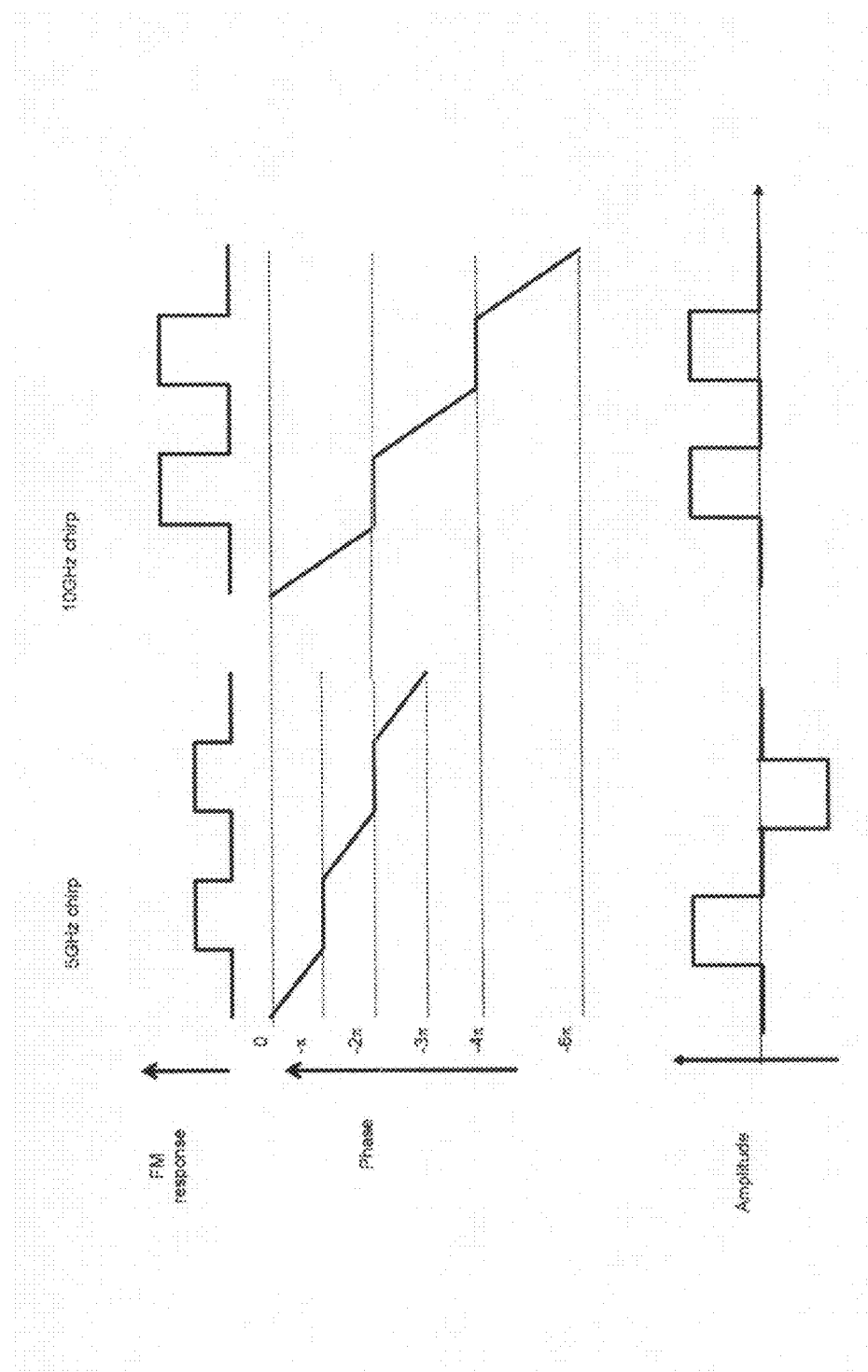
FIG. 2 illustrates the instantaneous frequency and phase of a 101 bit sequence for flat-topped chirp values of 5 GHz and 10 GHz for a 10 Gb/s digital signal.

In one preferred embodiment of the present invention, the CML™ consists of a directly modulated DFB laser and an optical spectrum reshaper (OSR). The distributed feedback (DFB) laser is modulated with an electrical digital signal, wherein a digital signal is represented by 1 bits and 0 bits. The DFB laser is biased high above its threshold, for example, at 80 mA, and is modulated by a relatively small current modulation; the resulting optical signal has amplitude modulation (AM), the 1 bits having larger amplitude than the 0 bits. The ratio of the amplitude of the 1 bits to the 0 bits is typically referred to as the extinction ratio (ER). Importantly, the modulated optical signal has a frequency modulation component, called adiabatic chirp, which is concomitant with the amplitude modulation and nearly has the same profile in time, an example of which is shown in FIG. 1. The extinction ratio (ER) of the optical output can be varied over a range depending on the FM efficiency of the laser, defined as the ratio of the adiabatic chirp to the modulation current (GHz/mA). A higher modulation current increases ER, as well as the adiabatic chirp.

The chirp property of directly modulated lasers has been known for some time. When the laser is modulated with an electrical digital signal, its instantaneous optical frequency changes between two extremes, corresponding to the 1s and 0s, and the difference in the frequency changes is referred to as adiabatic chirp. In addition to adiabatic chirp, which approximately follows the intensity profile, there are transient frequency components at the 1 to 0 and 0 to 1 transitions of the bits, called transient chirp. The magnitude of transient chirp can be controlled by adjusting the bias of the laser relative to the modulation current. In one embodiment of the present invention, the transient chirp component is minimized by using a high bias and small modulation. The signal is then passed through an optical spectrum reshaper (OSR), such as the edge of an optical band pass filter with a sharp slope. The OSR modifies the frequency profile of the input optical signal, generating a flat-topped and square shaped frequency profile such as that shown in FIG. 1. In the preferred embodiment of the present invention, the magnitude of the resulting flat-topped chirp is chosen to be such that it provides a special phase correlation between the bits, as described below. Given an FM efficiency value, $\eta_{FM}$, the desired adiabatic chirp, $\Delta v$ specifies the modulation current, $\Delta i = \Delta v / \eta_{FM}$, which in turn determines the extinction ratio, $$ER = 10 \log\left(\frac{I_b - I_{th} + \Delta i}{I_b - I_{th} - \Delta i}\right),$$

where $I_b$ is the bias current, and $I_{th}$ is the threshold current of the laser. The magnitude of the flat-topped chirp after the OSR is determined by the magnitude of the adiabatic chirp at the output of the laser and the slope of the OSR. For a 10 Gb/s NRZ signal, for example, the desired adiabatic chirp is ~4.5 GHz, and the ER ~1 dB for a DFB laser with FM efficiency ~0.2 GHz/mA. Passing this optical signal through an OSR with average slope of approximately 2.3 dB/GHz increases this chirp magnitude to about 5 GHz. The significance of this value is the desired phase correlation between the bits as described below.

One important aspect of the present invention is the realization that as the frequency of an optical signal is changing with time, due to the chirp, the optical phase of the bits changes as well, depending on the bit period, rise fall times and the amount of chirp. It should be noted that when monitoring the optical carrier wave, which is a sine wave, it can be observed that at some point in time, phase is a particular position on the carrier wave. The phase difference between the crest of the wave and its trough, for example, is $\pi$. Frequency describes the spacing between the peaks; higher frequency means the waves are getting bunched up and more crests are passing by per unit time. Mathematically, phase is the time integral of optical frequency. When the laser is modulated by a digital signal with bit period T, the optical phase difference between two bits depends on the flat-topped chirp, as well as on the total time difference between the bits. This phase difference can be used to increase the propagation of the signal in the fiber as is shown in the following example.

An optical electric filed is characterized by an amplitude envelope and a time varying phase and a carrier frequency as follows:

$$E(t) = A(t) \exp(-i\omega_0 t + i\phi(t)) \quad (1)$$

where A(t) is the amplitude envelope, $\omega_0$ is the optical carrier frequency, and $\phi(t)$ is the time varying phase. For example, for a chirp-free, or so-called transform limited, pulse, the time varying phase is zero. The instantaneous frequency is defined by the following equation:

$$f(t) = -\frac{1}{2\pi} \frac{d\phi(t)}{dt} \quad (2)$$

Note that the negative sign in Equation 2 is based on the complex notation convention that takes the carrier frequency to be negative frequency. Hence the optical phase difference between two time points on the optical filed is given by:

$$\Delta \phi = \phi(t_2) - \phi(t_1) = 2\pi \int_1^2 f(t) dt \qquad (3)$$

Let's consider a 101 bit sequence at the output of a CML™ having a certain magnitude flat-topped chirp. Taking the frequency of the 1 bits as a reference frequency, we obtain the plot shown below in two cases for a 10 Gb/s digital signal (100 ps pulse duration) for flat-topped chirp values of 5 GHz and 10 GHz. The pulses are assumed to have ideal square shape amplitudes and flat-topped chirp with 100 ps duration. Significantly, for 5 GHz of flat-topped chirp there is a π phase shift between the two 1 bits separated by a single zero.

$$\Delta\phi = 2\pi \times 5 \text{ Ghz} \times 100 \text{ ps} = \pi \qquad (4)$$

Following Equations 3 and 4, the phase shift is 2π between two 1 bits separated by two 0 bits, and 3π for two 1 bits separated by three 0 bits and so on. In general, two 1 bits separated by an odd number of 0 bits are π out of phase for 5 GHz of chirp, and a 10 Gb/s signal. For 10 GHz of chirp and 10 Gb/s square pulses the 1 bits separated by odd number of bits are in phase; i.e. phase difference is 2π.

Figure 3:
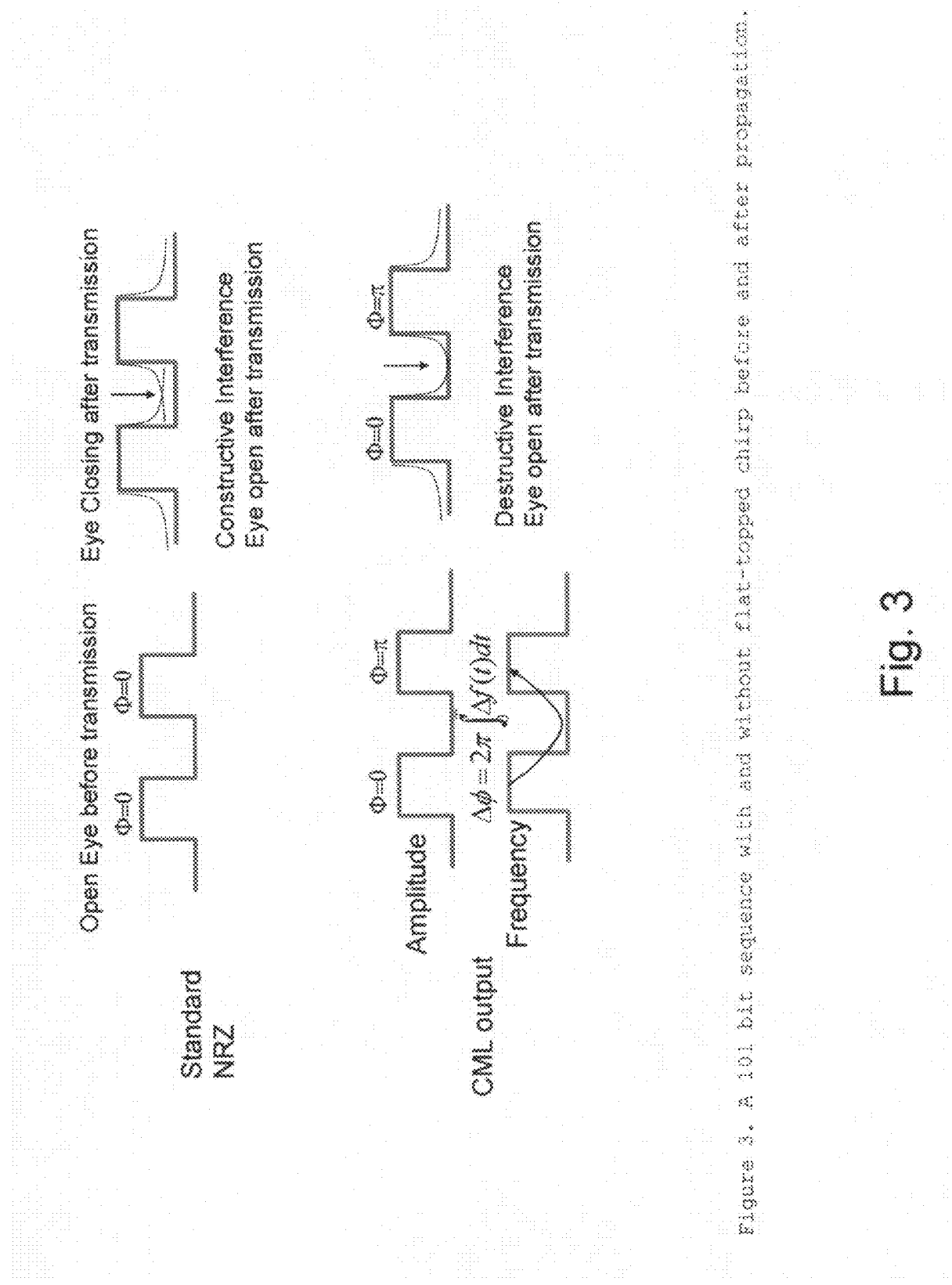
FIG. 3 illustrates a 101 bit sequence with (CML output) and without (Standard NRZ) flat-topped chirp before and after propagation.

The significance of this phase shift is realized when the 101 bit sequence with 5 GHz of flat-topped chirp is propagated through dispersive fiber, where each pulse broadens due to its finite bandwidth. FIG. 3 shows that the π phase shift causes the two bits to interfere destructively at the center of the 0 bit, therefore keeping the 1 and 0 bits distinguishable by the decision circuit at the receiver. The decision threshold chooses a threshold voltage above which all signals are counted as 1 and below which they are counted as 0 bits. Hence, the phase shift helps differentiate between the 1 and 0 bits and the pulse broadening does not reduce the BER for this bit sequence. Therefore, the π phase shift constructed, based on the preferred embodiment of the present invention, increases tolerance to dispersion. For intermediate chirp values, there is partial interference, which is enough to extend transmission distance, but not to distances in the case described above.

Optical Spectrum Reshaping

In one embodiment of the present invention, the FM modulated signal generated is passed though an optical spectrum reshaper so as to change the instantaneous frequency profile of the signal across the 1 and 0 bits in such a way so as to increase the tolerance of the signal to dispersion. In the prior art, such as UK Patent No. GB 2107147A by R. E. Epworth, the signal from the FM source is filtered to produce an intensity modulation, which is higher modulation depth after passing through the filter than that before passing through the filter. In the present invention, optical spectrum reshaping, rather than increase in amplitude modulation alone, can be achieved using an optical spectrum reshaper (OSR). In one embodiment of the present invention, the instantaneous frequency profile of the output signal is modified across its bits after the OSR, so as to increase the distortion free propagation distance.

In a preferred embodiment of the present invention, a semiconductor laser is directly modulated by a digital base signal to produce an FM modulated signal with adiabatic chirp. The output of the laser is then passed through an OSR, which, in this example, may be a 3 cavity etalon filter used at the edge of its transmission. The chirp output of a frequency modulated source, such as a directly modulated laser, is adiabatic. This means that the temporal frequency profile of the pulse has substantially the same shape as the intensity profile of the pulse.

In a preferred embodiment, the OSR converts the adiabatic chirp to flat-topped chirp, as described in U.S. patent application Ser. No. 11/084,630, filed Mar. 18, 2005 by Daniel Mahgerefteh et al. for FLAT-TOPPED CHIRP INDUCED BY OPTICAL FILTER EDGE, which patent application is hereby incorporated herein by reference.

Figure 4:
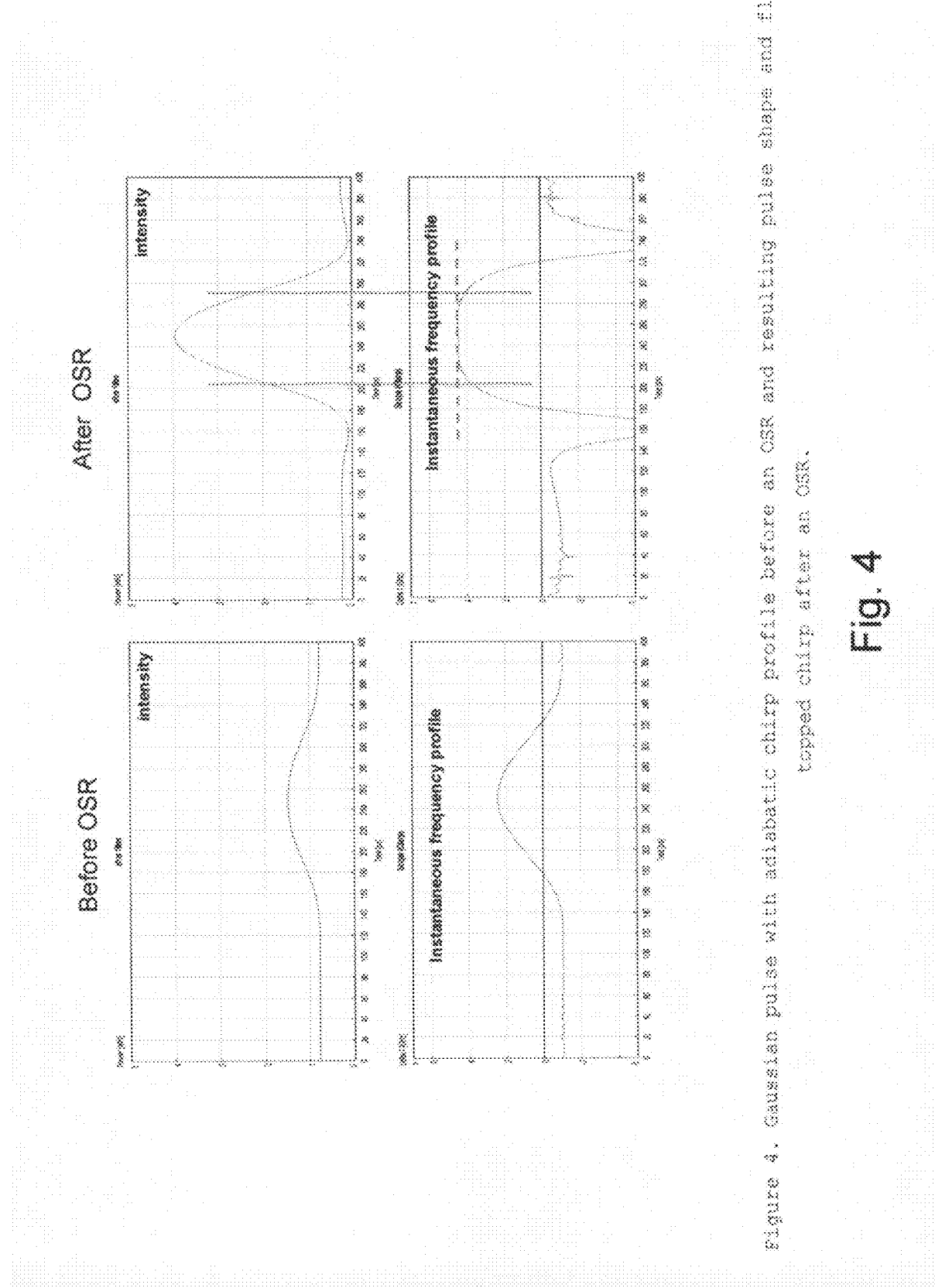
FIG. 4 illustrates a Gaussian pulse with adiabatic chirp profile before an OSR and the resulting pulse shape and flat-topped chirp after an OSR.

FIG. 4 shows the optical intensity and the instantaneous frequency profile of a Gaussian pulse before and after an OSR. The Gaussian pulse has adiabatic chirp before the OSR, i.e., its instantaneous frequency profile has the same Gaussian shape as its intensity profile. After the OSR, both the amplitude and instantaneous frequency profiles are altered. The ratio of peak power-to-power in the background (extinction ratio) is increased, and the pulse narrows slightly in this example. An important aspect of the present invention is the flat-topped instantaneous frequency profile resulting from passage through the OSR, indicated by the dotted horizontal green line in FIG. 4. The flat-topped chirp is produced when the spectral position of the optical spectrum of the signal is aligned with the edge of the OSR transmission. The optimum position depends on the adiabatic chirp and the slope of the OSR transmission edge.

Figure 5:
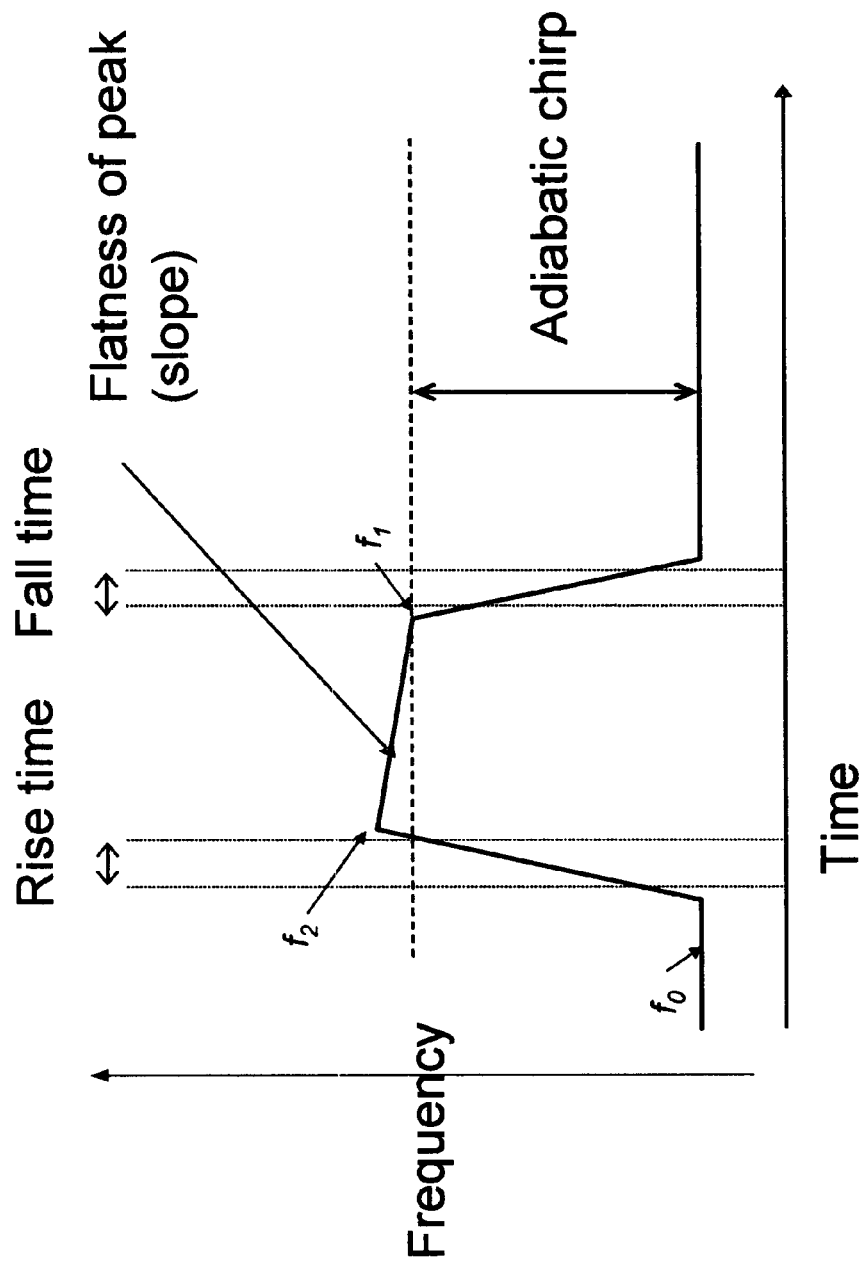
FIG. 5 illustrates the instantaneous frequency profile of the pulse and definitions of the pulse.

The instantaneous frequency profile of a flat-topped chirp pulse is characterized by a rise time, a fall time, duration and a slope of the flat-top, and a flat-topped chirp value as shown in FIG. 5. The slope, in turn, can be defined by the two frequency values $f_2$ and $f_1$. In an embodiment of the present invention the rise time, fall time, duration, and slope of the top-hat portion of the frequency profile are adjusted relative to the rise time, fall time, duration of the amplitude profile, in order to increase the transmission distance of the signal beyond the dispersion limit.

Figure 6:
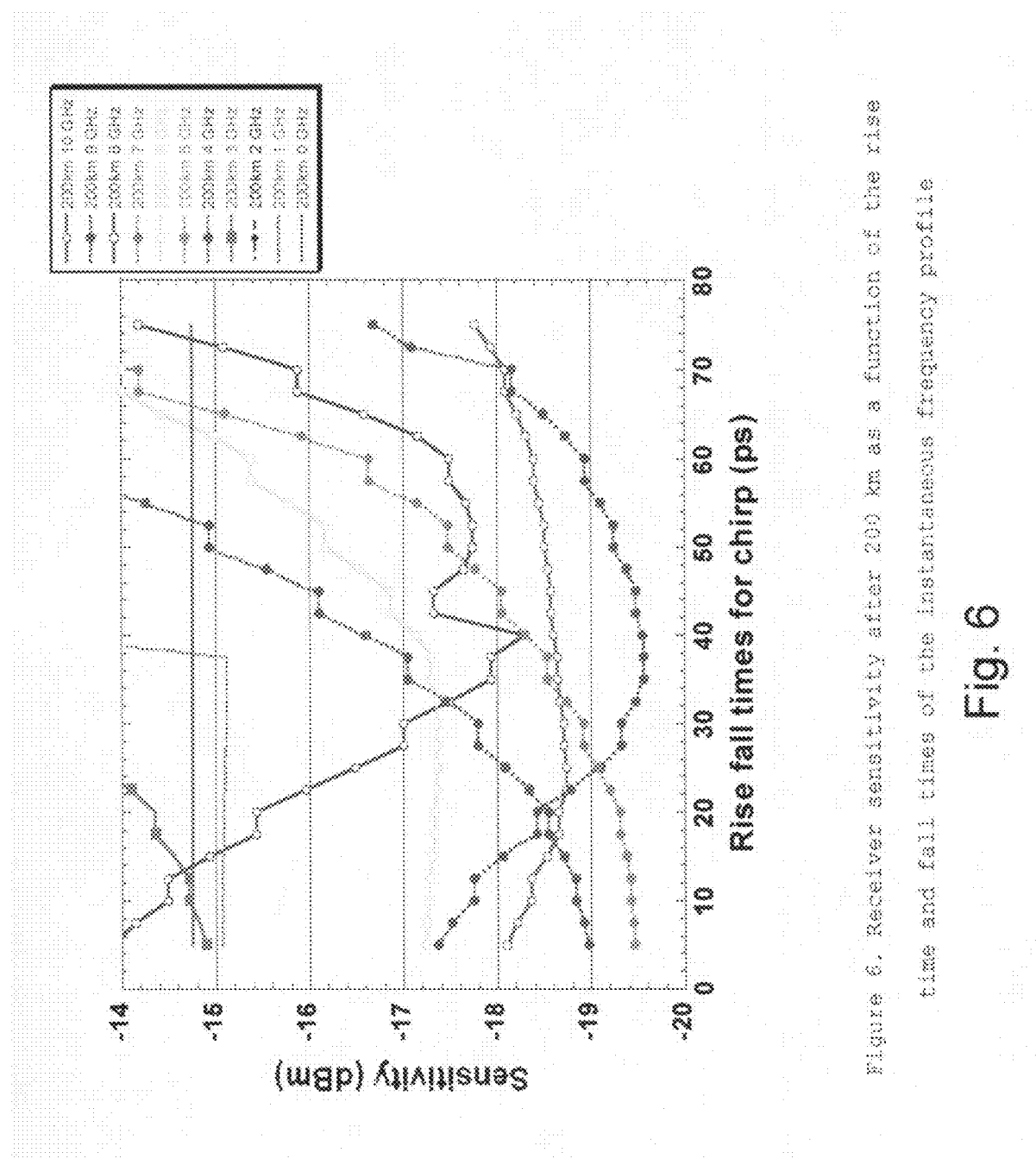
FIG. 6 illustrates the receiver sensitivity after 200 km as a function of the rise times and fall times of the instantaneous frequency profile.

The importance of reshaping the instantaneous frequency profile of the pulses can be realized by simulation which shows the bit error rate of such a spectrally reshaped 10 Gb/s pulse after propagation though 200 km of dispersive fiber having 17 ps/nm/km dispersion. FIG. 6 shows that for a given flat-topped chirp value as measured in the instantaneous frequency profile of the signal after the OSR. In such a case, the BER sensitivity can be optimized by varying the rise time and fall time. Also, for a given rise time and fall time of the instantaneous frequency profile, the chirp value can be varied over a range from 3 GHz to 10 GHz in order to achieve a desired BER sensitivity after propagation through fiber.

The following conclusions can be drawn from this example calculation:

(i) the optimum adiabatic chirp after the OSR is 5 GHz, with short rise time and fall time for the instantaneous frequency profile; this achieves the lowest sensitivity after fiber propagation;

(ii) any chirp in the range of 3-10 GHz can be used to extend transmission relative to the case of no chirp. The rise time and fall times have to be adjusted based on the adiabatic chirp value. In the above example, a rise time and fall time of <30 ps is always optimum; and (iii) the rise time and fall time of the instantaneous frequency can be reduced by increasing the slope in dB/GHz of the transmission profile of the OSR. Slope of top-hat portion of the frequency profile is determined by the dispersion of the OSR and provides further dispersion tolerance.

Figure 7:
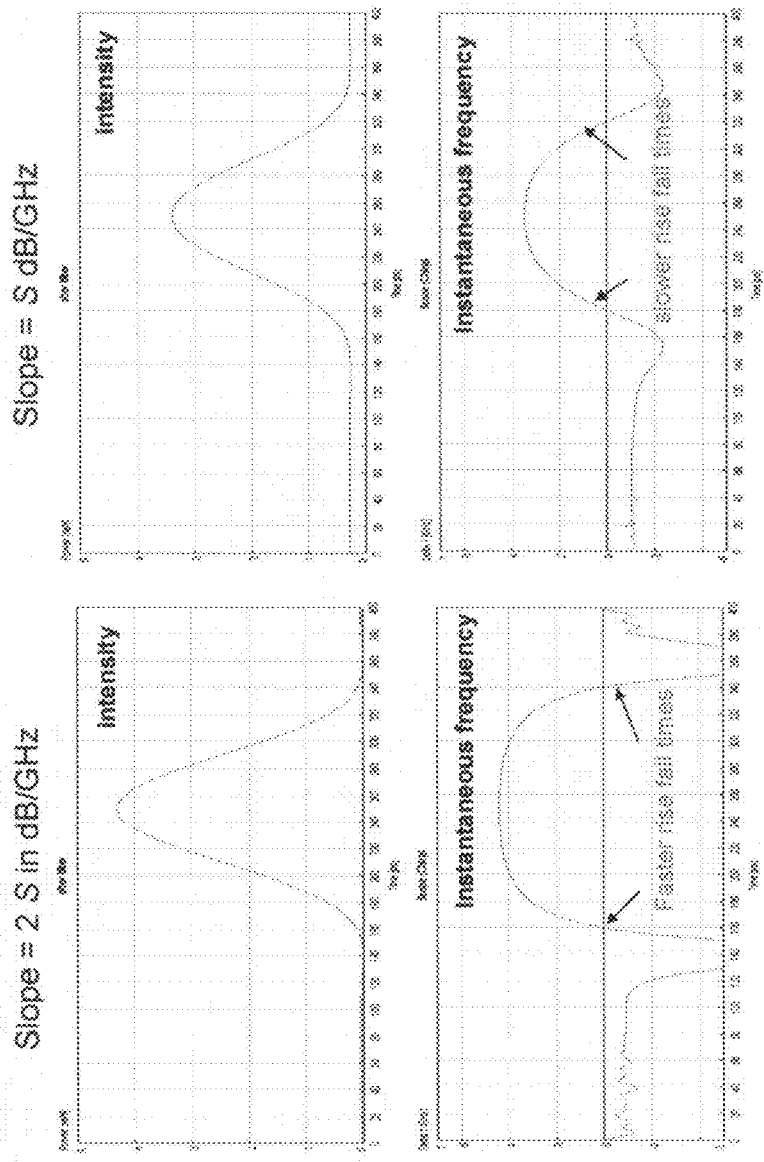
FIG. 7 illustrates the instantaneous frequency profile and intensity profile after an OSR with two different slopes.

FIG. 7 shows another example, where the rise time and fall time of the instantaneous frequency profile are reduced after the OSR by increasing the slope in dB/GHz of the OSR, here by a factor of 2. In one embodiment of the present invention, the output of a frequency modulated signal is passed through an OSR and the rise time and fall time of the frequency profile are reduced by increasing the slope (in dB/GHz) of the OSR.

Spectral Narrowing

Figure 8:
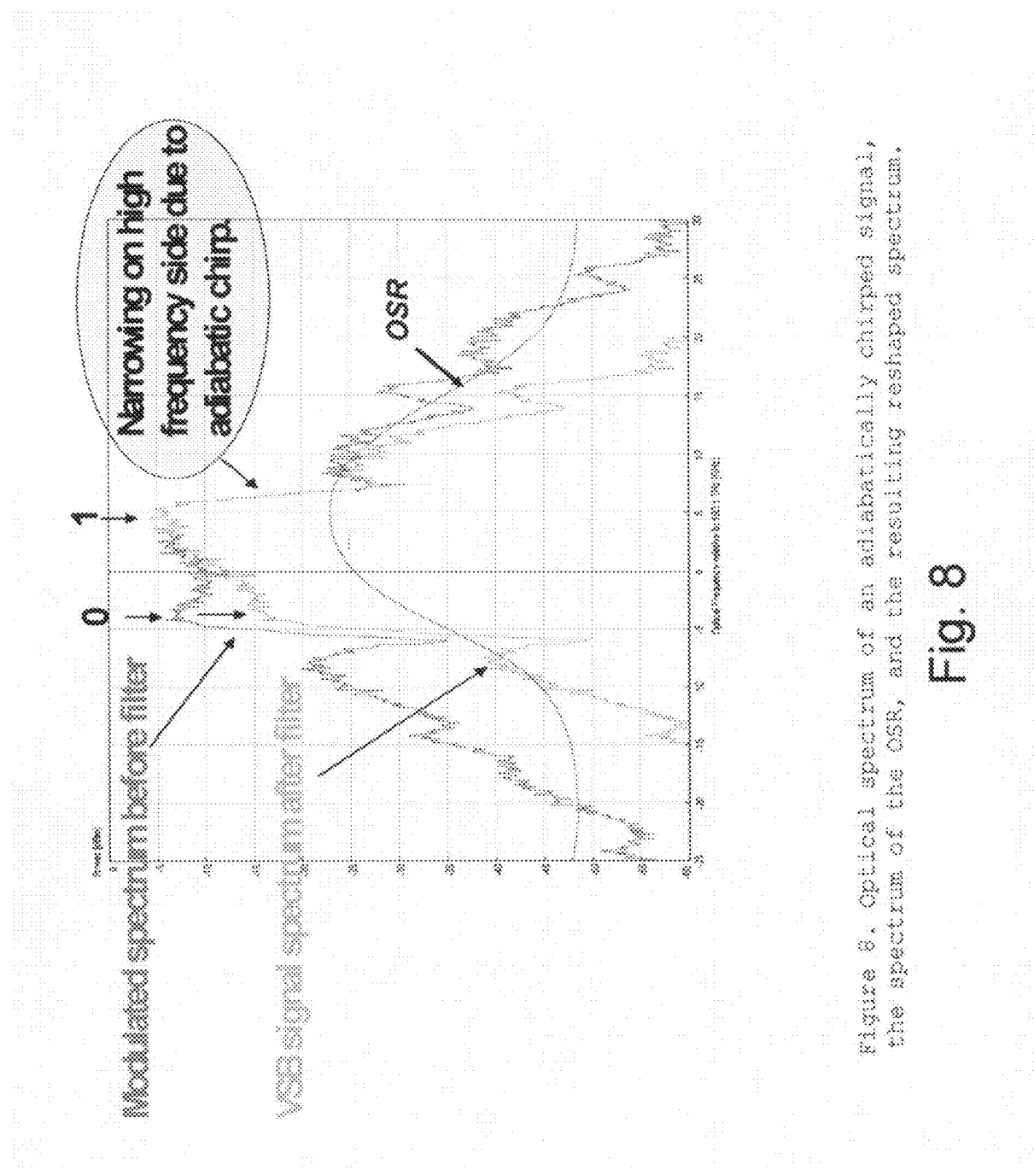
FIG. 8 illustrates the optical spectrum of an adiabatically chirped signal, the spectrum of the OSR, and the resulting reshaped spectrum.

Simultaneous frequency modulation and amplitude modulation with the same digital information reduces the optical bandwidth of the signal and suppresses the carrier frequency. This effect is most marked for a chirp value that is ½ the bit rate frequency; i.e., 5 GHz chirp for 10 Gb/s. This corresponds to the phase change of 0 to π between 1 bits separated by an odd number of 0 bits, i.e., optimum correlation between the phases of the otherwise random bit sequence. For an approximate range of chirp values between 20% to 80% of the bit rate frequency (2-8 GHz for 10 Gb/s bit rate) the carrier is significantly suppressed and the spectrum is narrowed. For 0 value of chirp or for chirp equal to the frequency of the bit rate frequency, the carrier is present and the spectrum broadens again. This is because the phase of all the pulses becomes equal for these two cases and the phase correlation is lost. As shown in FIG. 8, the narrowing of the spectrum by application of amplitude modulation and frequency modulation narrows the spectrum on the high frequency side. Note that in this example the chirp is ~7.5 GHz for 10 Gb/s. The spectral position of the signal relative to the peak transmission of the OSR is adjusted such that the spectrum in on the low frequency edge of the OSR. This further reduces the spectral width on the low frequency side. Reducing the spectral bandwidth extends the transmission distance.

In one embodiment of the present invention the Bandwidth (BW) of the OSR is less than the bit rate. The spectrum of a digital signal is determined by the product of the spectrum of the digital information and the Fourier transform of the pulse shape. Using the correct amount of FM modulation (5 GHz of chirp for 10 Gb/s data rate) which gives a π phase shift between 1 bits separated by odd number of 0 bits as prescribed above, reduces the information BW. In order to increase tolerance to dispersion it is still necessary to reduce the spectrum of the pulse shape. This is done by a bandwidth limiting OSR in the preferred embodiment of the present invention.

FIG. 8 shows that for a given value of adiabatic chirp, the spectral position of the signal relative to the peak transmission of the OSR can be adjusted to increase the transmission distance. FIG. 8 shows the sensitivity for a 10 Gb/s signal at the transmitter (Back-back) and after propagation through 200 km of fiber having 17 ps/nm/km of dispersion as a function of the spectral shift relative to the OSR. Sensitivity is defined as the average optical power (in dBm) required to achieve a bit error rate of $10^{-12}$. The OSR in this example is a 3 cavity etalon. It is therefore an embodiment of the present invention to adjust the adiabatic chirp of the frequency modulated source as well as the spectral position of the resulting spectrum relative to the OSR in order to achieve a desired bit error rate after propagation through dispersive fiber.

Figure 9:
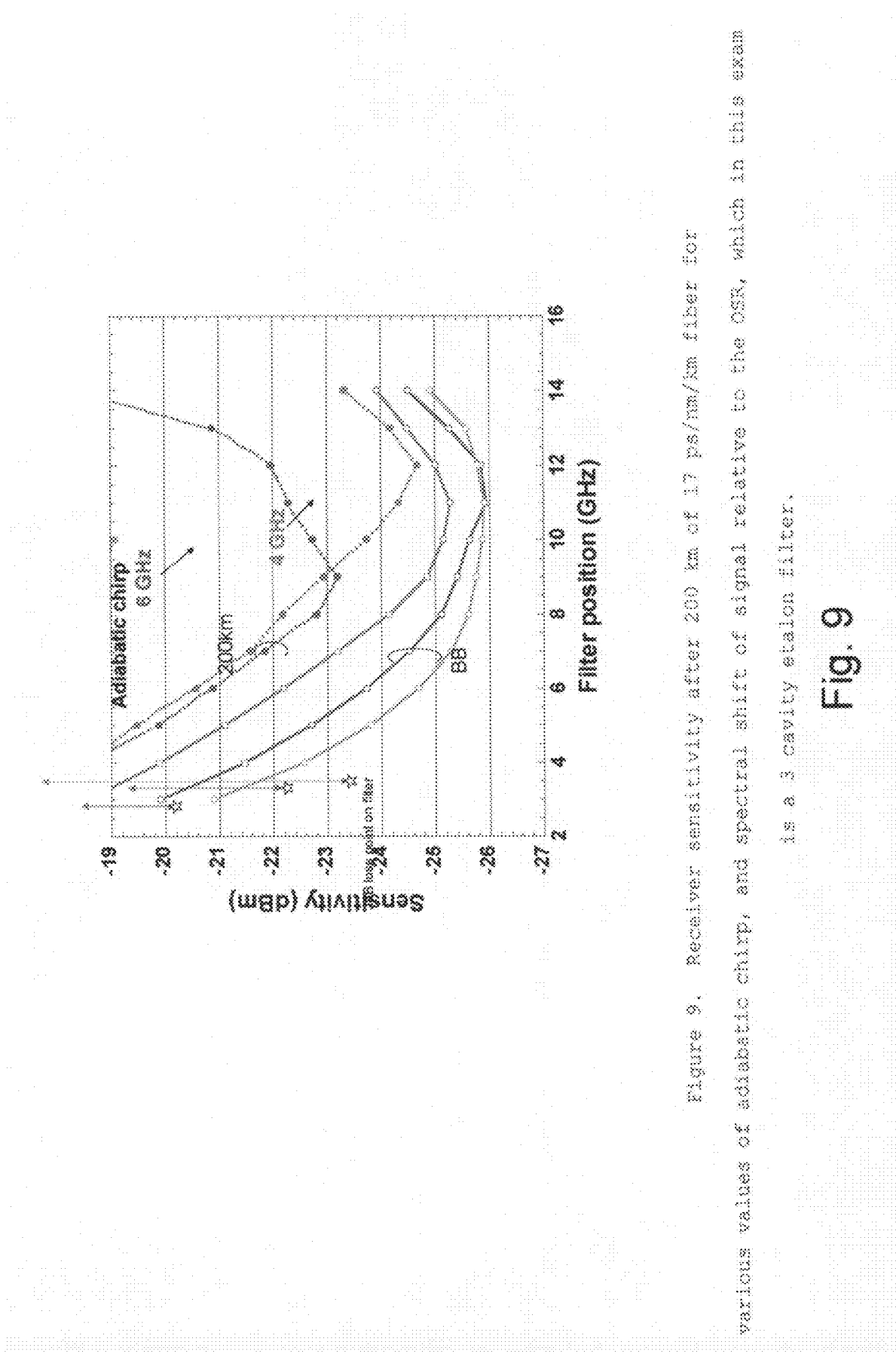
FIG. 9 illustrates receiver sensitivity after 200 km of 17 ps/nm/km fiber for various values of adiabatic chirp, and the spectral shift of signal relative to the OSR, which in this example is a 3 cavity etalon filter.
Figure 10:
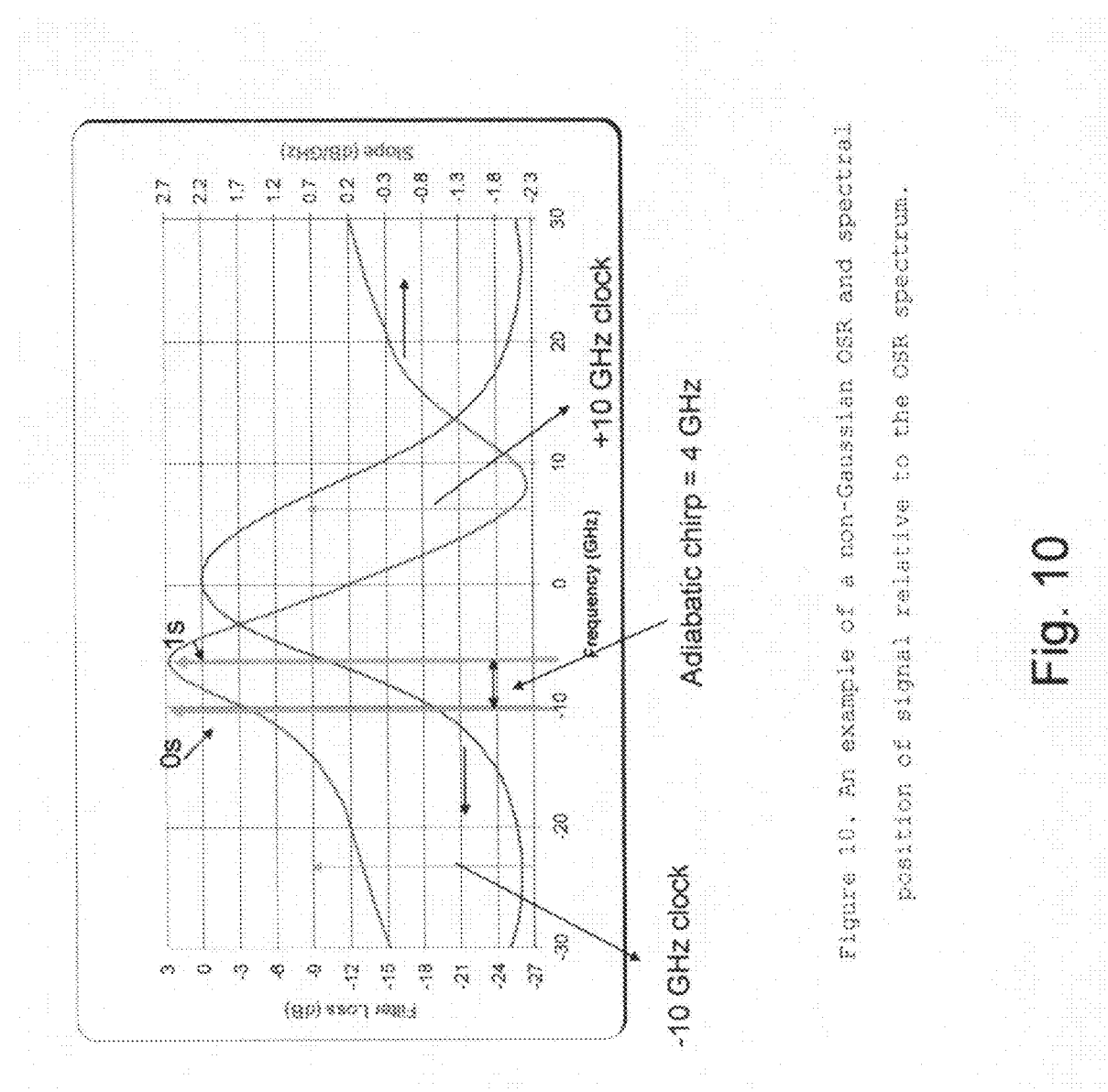
FIG. 10 illustrates an example of a non-Gaussian OSR and the spectral position of the signal relative to the OSR spectrum.

FIG. 9 shows an example of an OSR, formed by a non-Gaussian shaped band pass filter. FIG. 9 shows the transmission profile in dB scale as well as the derivative, or frequency dependent slope, of the OSR. FIG. 9 also shows the spectral position of the input FM signal to be reshaped. It is a preferred embodiment of the present invention that the optimal spectral position of the FM signal on the OSR be such that the 1s peak frequency be near the peak logarithmic derivative of the transmission profile of the OSR. In this example, the derivative is not linear on the dB scale, indicating that the OSR has a non-Gaussian spectral profile. A Gaussian OSR would have a linear slope as a function of frequency. FIG. 9 also shows the position of the clock frequency components of the input FM signal, which are reduced substantially after the OSR. This in-turn reduces the clock frequency components in the RF spectrum of the resulting second signal after the OSR. In this example, the peak slope is 2.7 dB/GHz, and the 3 dB bandwidth of the OSR in this case is approximately 8 GHz.

It is an embodiment of the present invention for the OSR to also reduce the clock frequency components, 10 GHz for a 10 Gb/s NRZ signal, in the RF spectrum of the signal resulting after the OSR.

The optimum OSR shape is one for which the transmitter has good performance both at its output (Back-to-back) as well as after transmission. The back-to-back performance is determined by having minimum distortion of the bits in the eye diagram, while after transmission performance is determined by a low dispersion penalty. As described in U.S. patent application Ser. No. 11/084,630, which patent application is hereby incorporated herein by reference, a certain value of filter slope is required to convert an adiabatically chirped input signal to one having flat-topped chirp. It was shown that the OSR converts the first derivative of the amplitude of the input pulse to blue shifted transient chirp at the edges. For an optimum value of slope the added transient chirp increases the chirp at the edges to produce a nearly flat top chirp.

Figure 11:
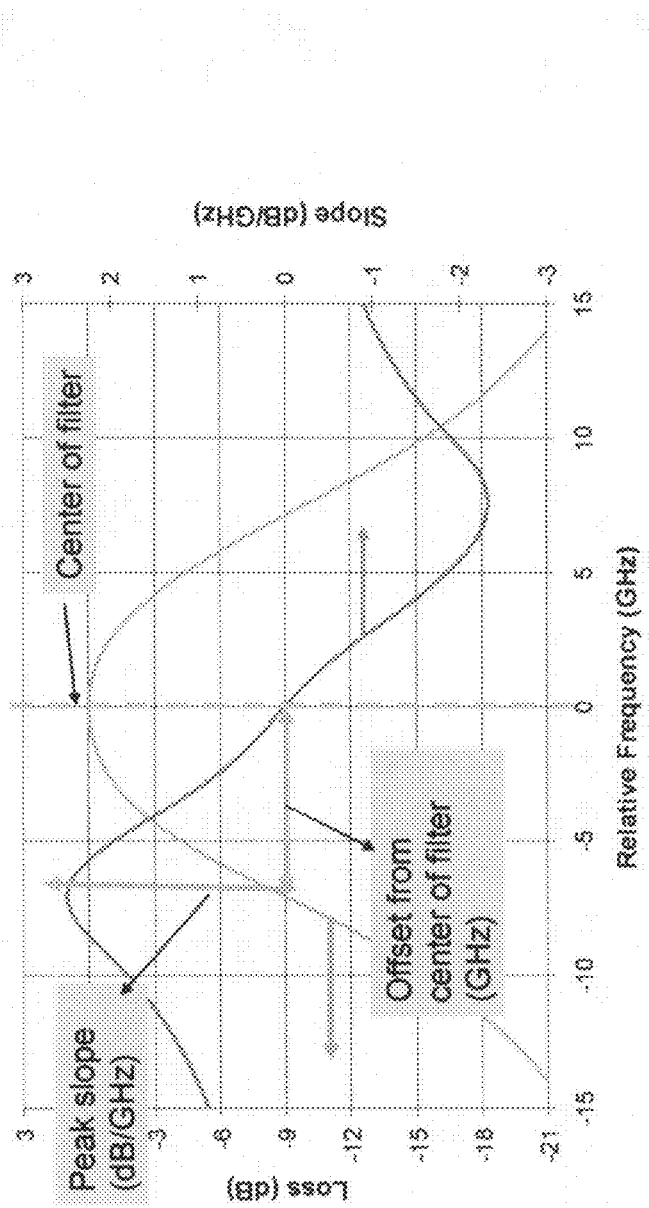
FIG. 11 illustrates the definition of slope of slope on an OSR.

U.S. patent application Ser. No. 11/084,630 discloses that a significant parameter of the OSR is the slope of its slope. As defined in the present invention, slope of slope (SoS) is the ratio of the peak logarithmic derivative of the transmission (in dB/GHz) to the frequency offset of this peak form the transmission peak (in GHz), as illustrated in FIG. 11. In one embodiment of the present invention, the slope of slope of an OSR is adjusted to optimize both the back-to-back transmitter BER and to reduce the BER after fiber transmission. For example, for a 10 Gb/s transmitter good back-to-back eye diagram, as well as low BER after transmission is obtained if the slope of slope is approximately in the range of 0.38 dB/GHz$^2$ to 0.6 dB/GHz$^2$. In addition the slope of the OSR near the center of the transmission needs to be approximately linear. Deviations from linearity introduce distortions in the resulting output eye diagram and thus cause increased bit error rate. A linear slope corresponds to a round-top shape filter. So, for example, a flat-topped filter, which has a near zero slope near the center is not desirable. The 3 dB band width of the band-pass OSR has to be in the range of 65% to 90% of the bit rate.

Figure 12:
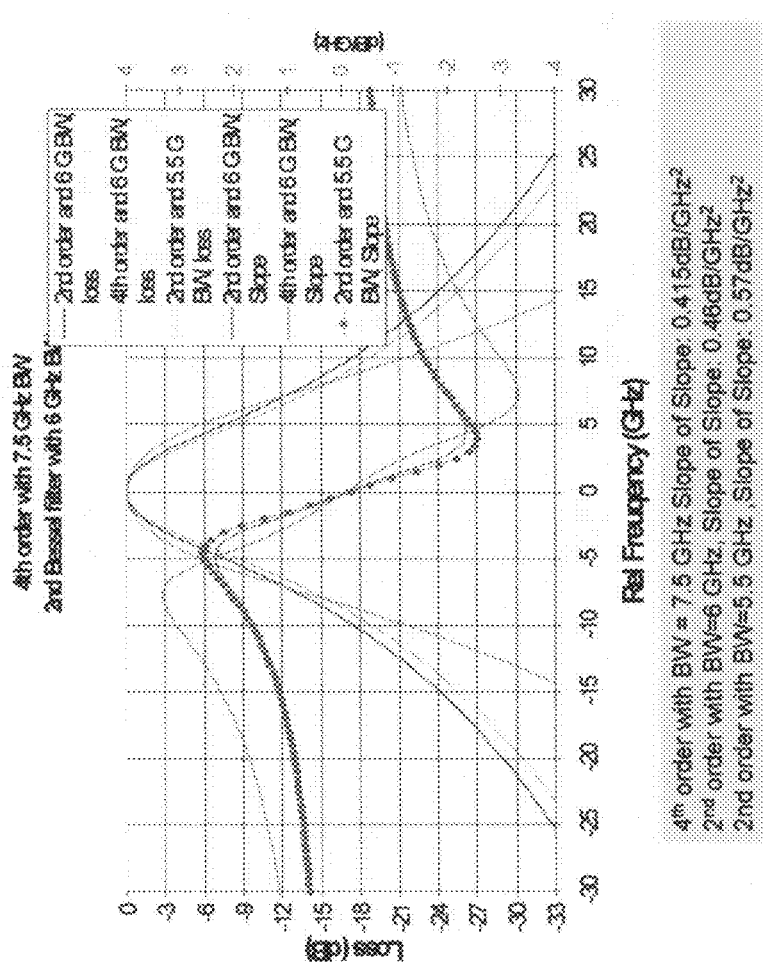
FIG. 12 illustrates Bessel filters used as OSR provide the desired slope of slope.

Two examples of such OSRs, as shown in FIG. 12, are 2$^{nd}$ order Bessel filters having a 6 GHz or 5.5 GHz band widths. The 2$^{nd}$ order Bessel filter shape is well known to the skilled in the art and is described mathematically by $$T(p) = \frac{1}{3 + 3p + p^2} \qquad (6)$$

where p=2if/Δf$_{3\ dB}$. Here T is the field transmission, f is the optical frequency offset from the center of filter, and Δf$_{3\ dB}$ is the 3 dB band width of the filter. The measured quantity is the optical transmission of the filter, which is the absolute square of the field transmission in Eq. 6, |T(p)|$^2$ and is plotted in FIG.

12. The Bessel filter is usually used as an electrical low pass filter because it minimizes distortion in its pass band. In one embodiment of the present invention, the Bessel filter is an optical filter, and it is chosen because it provides the desired slope of slope and linear slope near its peak transmission. The slope of slope for the $2^{nd}$ order Bessel filter with a 6 GHz bandwidth is 0.46 dB/GHz$^2$, and the slope of slope for the 5.5 GHz bandwidth $2^{nd}$ order Bessel filter is 0.57 dB/GHz$^2$. These examples show that the bandwidth of the filter can be adjusted to change SoS to be the desired value.

Another example of a filter that can be used in accordance with the present invention is a $4^{th}$ order Bessel filter with a band width of 7.5 GHz, also shown in FIG. 12. This OSR has a slope of slope of 0.41 dB/GHz$^2$. The field transmission of the $4^{th}$ order Bessel filter is given as a function of the normalized frequency by $$T(p) = \frac{1}{15 + 15p + 6p^2 + p^3} \quad (7)$$

Figure 13:
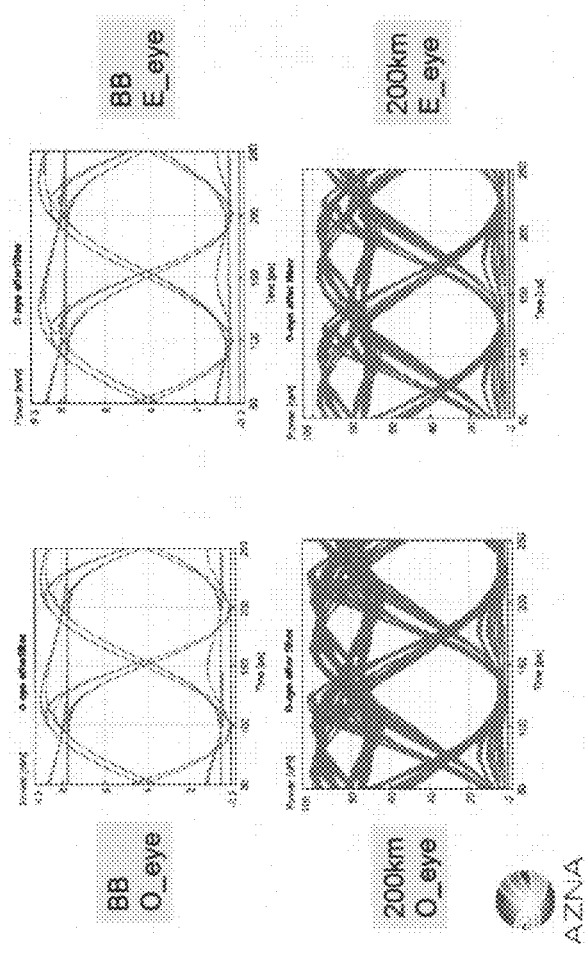
FIG. 13 illustrates optical and electrical eye diagrams before and after transmission through 200 km (3400 ps/nm) of fiber.

FIG. 13 shows examples of calculated eye diagrams for back-back and after 200 km of fiber having 3400 ps/nm dispersion. In this example, the $2^{nd}$ order Bessel filter with 5.5 GHz bandwidth was used. The eye diagrams on the left column are the back-back optical eye (so-called O-eye) of transmitter (top) and the eye transmitted after 200 km (3400 ps/nm). The eye diagrams on the right column are the eye diagrams measured after an optical to electrical converter with a typical ~8 GHz band width, which is called electrical eye (E-eye). The electrical eye is that at the output of the receiver, which converts the optical to electrical signal and provides it to the decision circuit for distinguishing the 1 and 0 bits.

Figure 14:
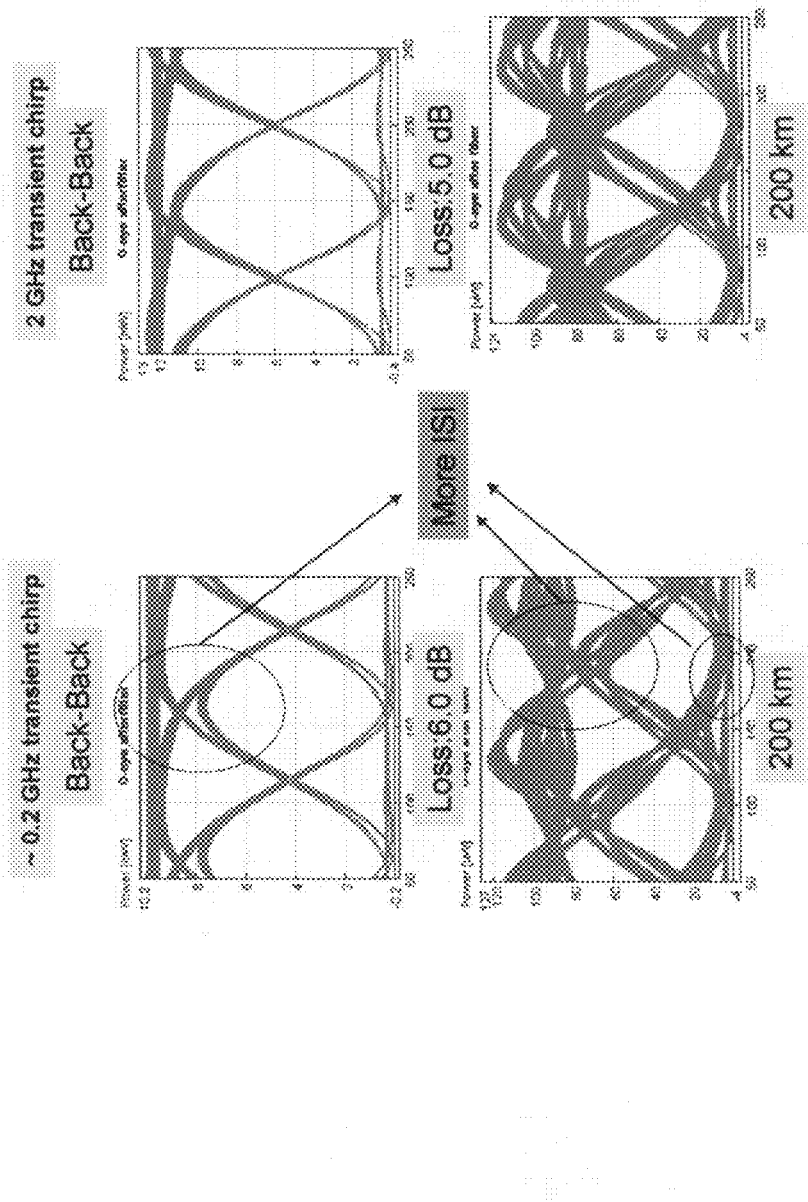
FIG. 14 illustrates eye diagrams for back-back and after 200 km of fiber for a chirp managed laser (CML™) transmitter with transient chirp at the output of the laser.

A directly modulated laser produces transient chirp, which occurs at the 1 to 0 and 0 to 1 bit transitions, in addition to adiabatic chirp. In a conventional directly modulated laser, transient chirp is detrimental as it hastens pulse distortion and increases BER after transmission. However, in the present invention, it has been found that when used as the FM source, where the directly modulated laser is followed by an OSR, some transient chirp at the output of the laser is desirable. FIG. 14 shows the results of simulation of a transmitter in accordance with the present invention. In this example, the adiabatic chirp of the laser is 4.5 GHz and the OSR is a 2 cavity etalon filter operated near its transmission edge.

FIG. 14 shows the eye diagrams of a 10 Gb/s transmitter at its output (back-back), as well as the eye after propagation through 200 km of fiber with 3400 ps/nm dispersion. The transient chirp at the output of the laser, before the OSR, is either nearly zero (~0.2 GHz) (left column) or 2 GHz (right column). Looking at FIG. 14, it is clear that the case having 2 GHz transient chirp produces a less distorted eye back to back. The eye after 200 km of fiber is also more open and has less inter-symbol interference (ISI) in the case having 2 GHz transient chirp. It is, therefore, one embodiment of the present invention to adjust the transient chirp of the frequency modulated source as well as the slope of slope of the optical spectrum reshaper to obtain the desired transmitter output having minimum distortion and to increase the error free propagation length of the transmitter beyond the dispersion limit.

Figure 15:
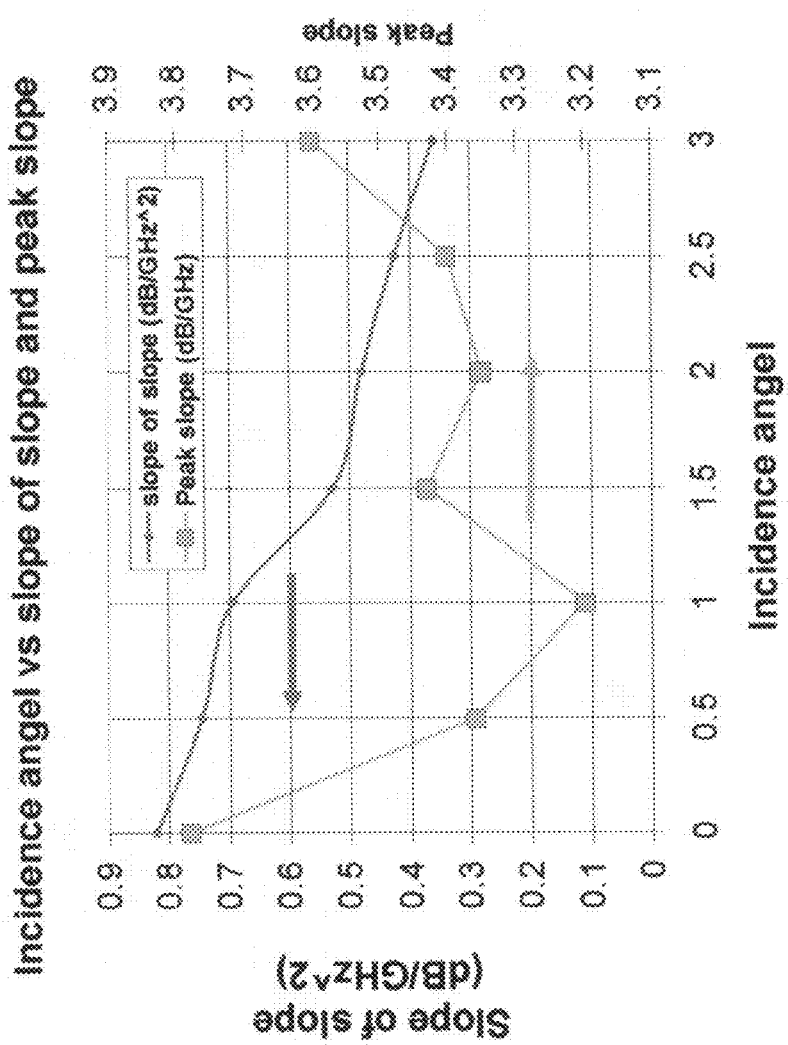
FIG. 15 illustrates measured slope and slope of slope for a 2 cavity etalon.

In practice, an optical filter such as a multicavity etalon may not have the desired transmission shape and slope of slope. Therefore, in another embodiment of the present invention, the angle of incidence and the beam divergence of the optical signal impinging upon the filter are adjusted to obtain the desired SoS. FIG. 15 shows an example of the measured slope as well as slope of the slope as a function of angle of incidence for a 2 cavity etalon. The peak slope initially decreases for increasing angles, reaches a minimum, and then increases again. The increase in slope at large angles is caused by spatial filtering, as described in U.S. Provisional Application Ser. No. 60/853,867, filed Oct. 25, 2006 by Kevin McCallion et al. for SPECTRAL RESPONSE MODIFICATION VIA SPATIAL FILTERING WITH OPTICAL FIBER, which patent application is hereby incorporated herein by reference. For the same range of angles the slope of slope monotonically decreases from 0.75 dB/GHz$^2$ to 0.35 dB/GHz$^2$ because the peak position is increasing with increasing angle. In this example, the optimum value of 0.45 dB/GHz$^2$ is obtained by adjusting the angle of incidence to 1.5 to 2 degrees.

Figure 16:
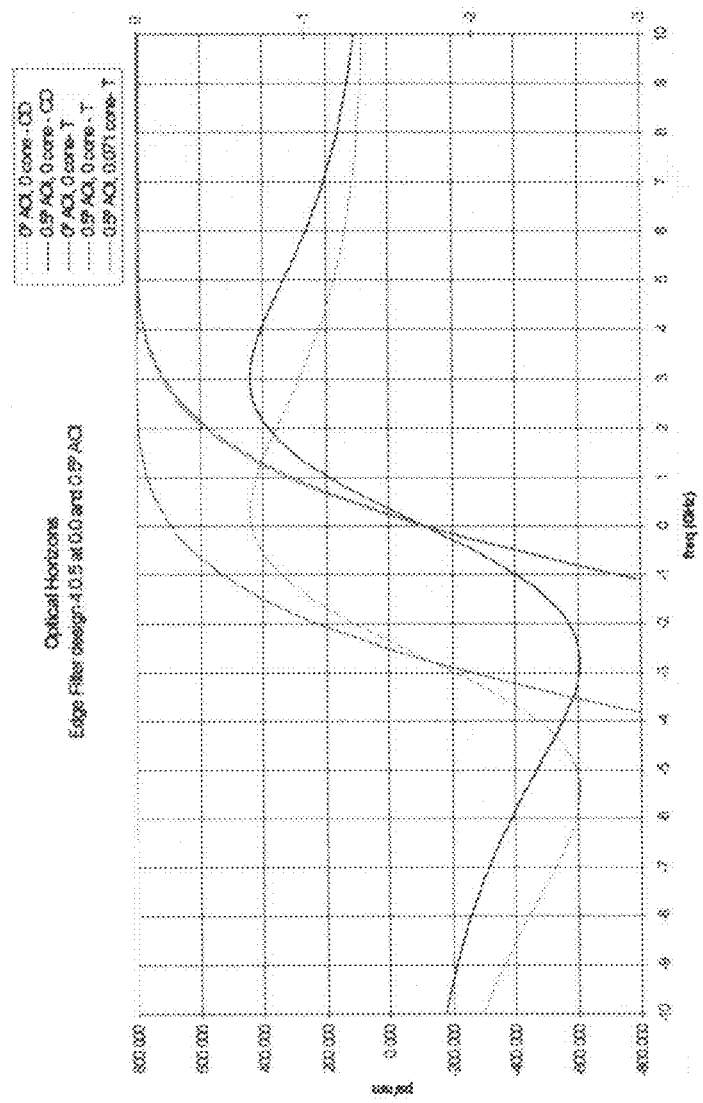
FIG. 16 illustrates transmission and slope of an edge filter used as an OSR.

In the above described examples, the optical spectrum reshaper (OSR) was a multicavity etalon filter. In another preferred embodiment of the present invention the OSR may be an edge filter, as shown in FIG. 16. The edge filter has a substantially flat transmission with frequency over a frequency range and a sharp edge on one side of the peak transmission. The position of the first optical signal in this case will be substantially on the slope of transmission.

OSR Dispersion

Figure 17:
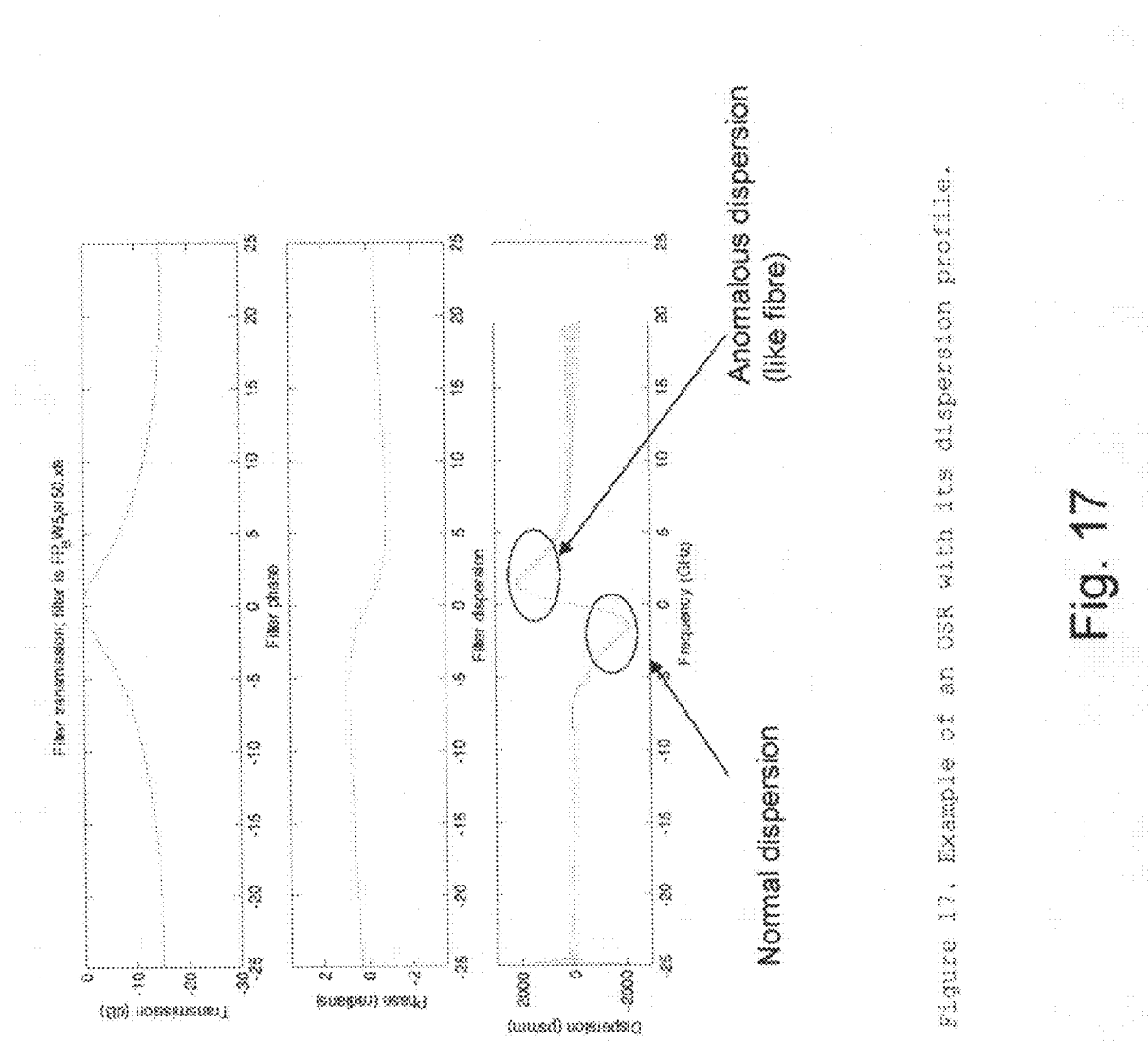
FIG. 17 illustrates an example of an OSR with its dispersion profile.

The OSR can also provide some dispersion compensation as well as the spectral reshaping. FIG. 17 shows the transmission characteristics of a filter and its corresponding dispersion profile.

Figure 18:
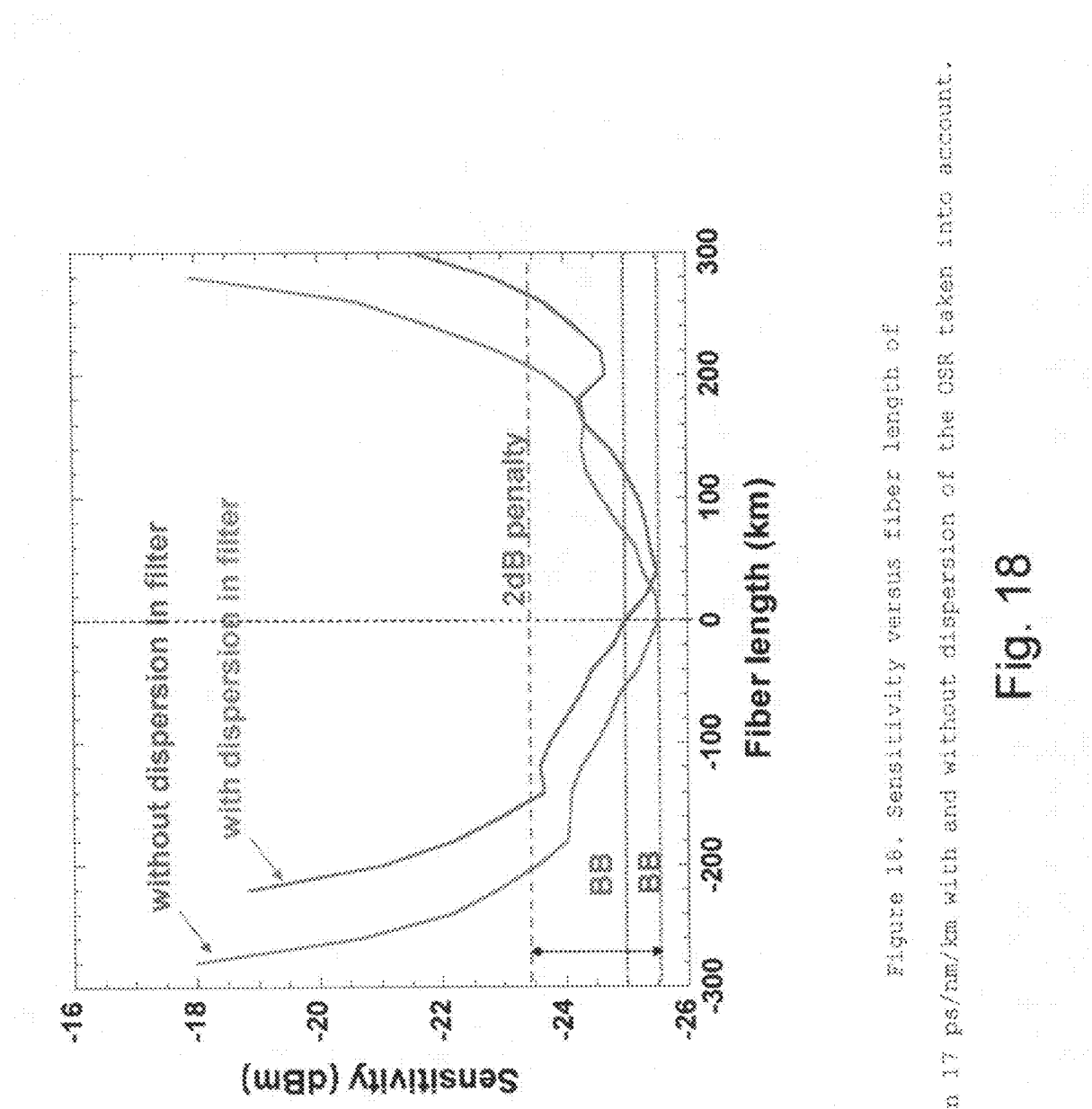
FIG. 18 illustrates sensitivity versus fiber length of dispersion in 17 ps/nm/km fiber with and without dispersion of the OSR taken into account.

The filter dispersion can compensate for a portion of the fiber dispersion. For example, if the laser frequency spectrum substantially overlaps with the normal dispersion peak, having a negative dispersion, the transmission for a standard single fiber having positive dispersion is extended. If the laser frequency spectrum substantially overlaps with the anomalous dispersion peak, where dispersion is positive, it reduces the transmission distance for a standard fiber with positive dispersion, but extends the reach over negative dispersion fiber such as Dispersion Compensating Fiber (DCF). FIG. 18 shows the sensitivity as a function of fiber distance for a case of an OSR with and without dispersion. The laser spectrum substantially overlaps with the negative dispersion peak of the OSR. As shown in FIG. 18, the negative distance indicates a fiber having negative dispersion of that length. So, for example, −100 km indicates a 100 km dispersion compensating fiber having −17 ps/nm/km dispersion.

FM Sources

The present invention teaches a variety of methods for generation of a dispersion tolerant FM signal with high extinction ratio (ER). In one preferred embodiment of the present invention the FM signal is generated in two steps.

First, a base digital signal is chosen to modulate a directly modulated DFB laser so as to generate an FM signal with adiabatic chirp such that the phase difference between two 1 bits separated by an odd number of 0 bits is an odd integer multiple of $\pi$. As an example, for a 10 Gb/s NRZ signal with 100 ps pulses and near square shaped instantaneous frequency profile, this is 5 GHz.

Figure 19:
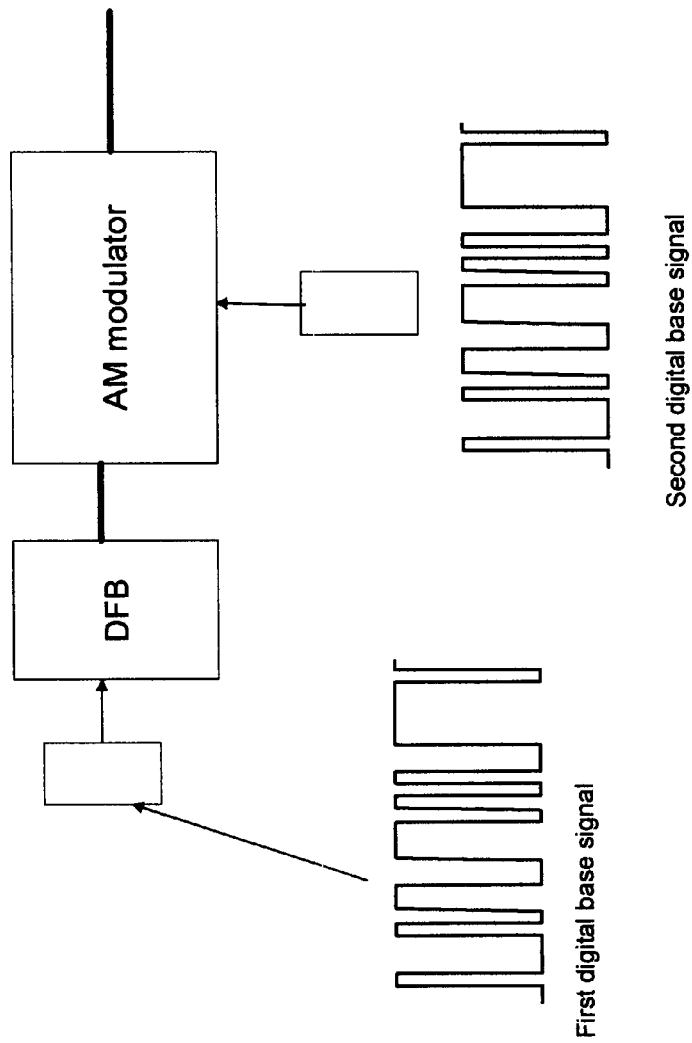
FIG. 19 illustrates FM optical source with a DFB FM modulator and separate amplitude modulator.
Figure 20:
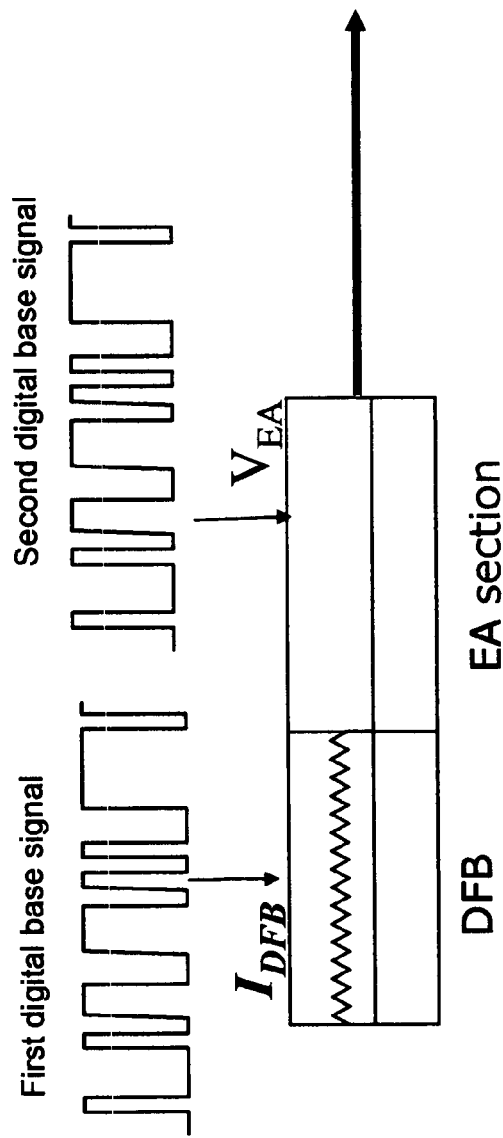
FIG. 20 illustrates FM optical source with a modulated DFB and integrated Electro-absorption modulator.

Next, the resulting optical signal is sent through a second amplitude modulator, such as a LiNbO$_3$ modulator or an electro-absorption modulator, as shown in FIG. 19. The amplitude modulator is modulated by a second digital base signal, which is a replica of the first digital base signal. The base signal supplied to the modulator may be inverted relative to that modulating the laser, depending on the transfer function of the modulator. This is the case, for example, if a higher signal increases the loss of the modulator. Hence, a high signal produces a higher amplitude optical signal from the laser and a corresponding low signal is supplied to the modulator. The AM modulator may be a variety of optical amplitude modulators such as a $LiNbO_3$ modulator, or an electroabsorption modulator. The DFB and EA may be integrated on the same chip, as shown in FIG. 20.

Figure 21:
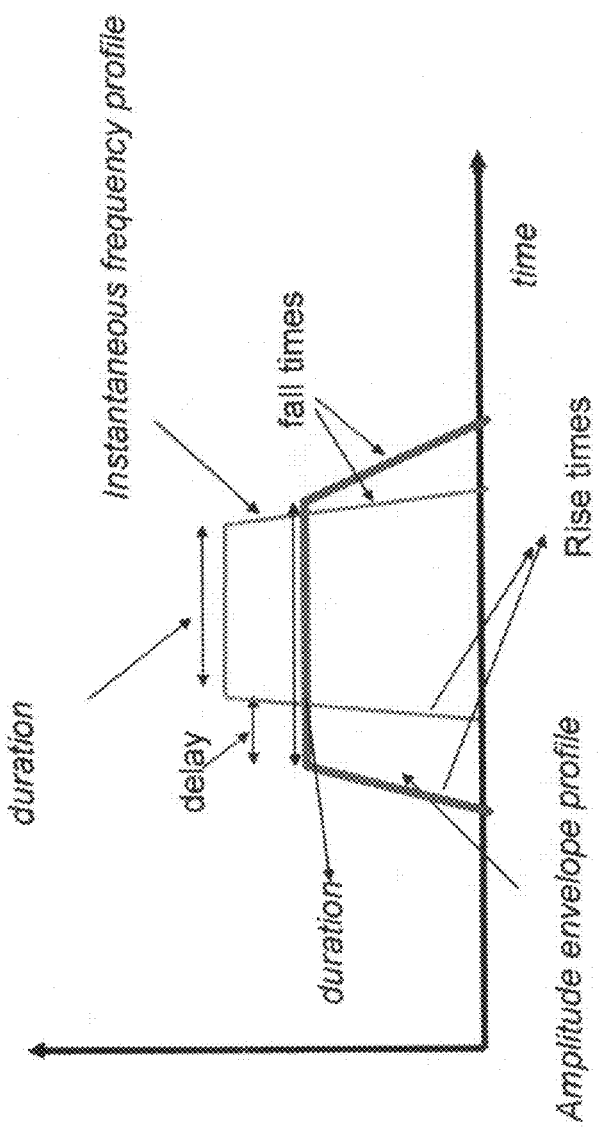
FIG. 21 illustrates the temporal profiles of the AM and FM signals.

In one preferred embodiment of the present invention, the first and second base signals supplied to the laser and modulator may be adapted to generate FM and AM signals, respectively. These FM and AM signals are different in temporal profiles, as demonstrated in FIG. 21, in that there may be a phase difference between the two digital base signals. Also, the rise time and fall time of the instantaneous frequency of the first signal and the rise time and fall time of the resulting second signal after the AM modulator may be different. In addition, the durations of the FM and AM pulse profiles may be different. In a preferred embodiment of the present invention the duration, rise time and fall time, adiabatic chirp, amplitude modulation depth, and the phase delay between the two digital base signals are varied, as described by the prescriptions and examples above, so as to increase the dispersion tolerance of the transmitted signal to fiber dispersion. These parameters for the frequency and amplitude profiles are defined in FIG. 21.

Figure 22:
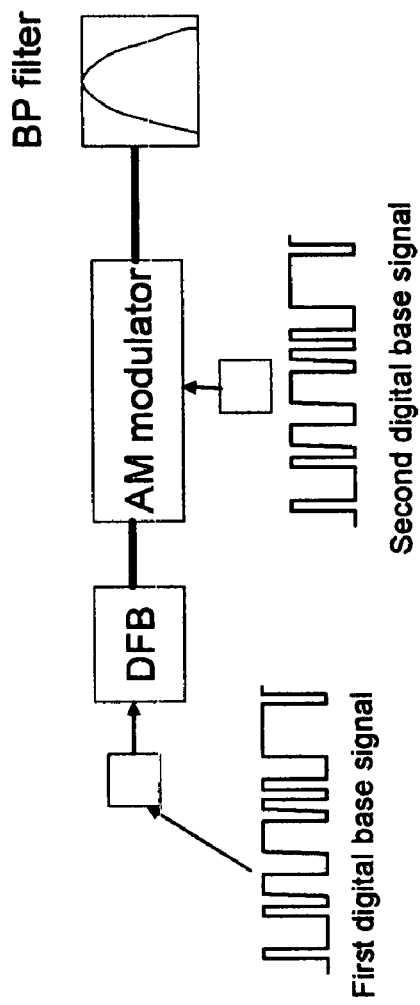
FIG. 22 illustrates an optical FM/AM source with a bandwidth limiting OSR or filter.

In another embodiment of the present invention, and as shown in FIG. 22, there may be a bandwidth limiting filter or an OSR placed after the FM/AM source described above. The OSR or filter is chosen so as to reduce the optical frequency components that are at, or higher than, the bit rate frequency, 10 GHz for a 10 Gb/s NRZ signal, for example.

Parameter Ranges

In various embodiments of the present invention, for longer distance transmission of signal, performance after the optical spectrum reshaper needs to be optimized, leading to the following preferred characteristics:

(i) AM ER<3 dB (i.e., the extinction ratio of the laser's intensity output is preferably less than 3 dB in order to minimize transient chirp);

(ii) adiabatic chirp in the range 2.5-7.5 GHz (i.e., the adiabatic chirp of the laser's output $\Delta f = f_1 - f_0 \approx 2.5\text{-}7.5$ GHz for optimum transmission); and (iii) Optical spectrum reshaper bandwidth is in the range of 5-10 GHz (i.e., the OSR has a filter bandwidth of 5-10 GHz to maximize spectral narrowing effect).

Chirp-Managed, Electroabsorption-Modulated Laser

As noted above, the quality and performance of a digital fiber optic transmitter is determined by the distance over which its signal can propagate without severe distortions. The bit error rate (BER) of the signal is measured at a receiver after propagation through dispersive fiber, and the optical power required to obtain a certain BER, typically $10^{-2}$, called the sensitivity, is determined. The difference in sensitivity at the output of the transmitter with the sensitivity after propagation is called dispersion penalty. This is typically characterized by the distance over which a dispersion penalty reaches ~1 dB.

Four types of optical transmitters are presently in use in fiber optic systems: (1) prior art directly modulated lasers (DML), (ii) prior art Electroabsorption Modulated Lasers (EML), (iii) prior art Externally modulated Mach Zhender (MZ) transmitters, and (iv) the new Chirp Managed Lasers (CML) of Azna LLC/Finisar Corporation of Wilmington, Mass. The CML transmitter comprises a directly modulated laser and an optical spectrum reshaper, as described in pending prior U.S. patent application Ser. No. 11/272,100, filed on Nov. 8, 2005, which patent application is hereby incorporated herein by reference. For transmission in standard single mode fiber at 10 Gb/s, and 1550 nm, MZ transmitters and EMLs can typically reach 80 km. The Chirp Managed Laser (CML) transmitter can reach >200 km at 10 Gb/s and at 1550 nm. On the other hand, directly modulated lasers (DML) reach <5 km because their inherent time-dependent chirp causes severe distortion of the signal after this distance.

A compact, low cost transmitter, capable of generating 2-4 dBm of modulated optical power, is desirable for 80 km applications in single mode fiber at 1550. Of the above transmitters, only MZ, EML and CML transmitters are potentially appropriate for this distance because of their transmission reach. The MZ is the most complicated transmitter, since it requires the fabrication of a DFB laser as well as a $LiNbO_3$ MZ modulator, in addition to the packaging of the two optical devices. The CML transmitter is simpler than the MZ transmitter, but requires more components than the EML transmitter, requiring a DFB chip as well as an optical spectrum reshaper filter, and supporting optics. The EML transmitter is potentially the lowest cost, and most compact device, for <80 km applications, since it comprises a single integrated chip. However, this is not the case in practice. The EML transmitter suffers from low output and/or poor transmission characteristics, decreasing the yield for the chip and increasing overall cost in volume manufacturing. The reason for this deficiency will be made clear in the following description of the present invention.

It is, therefore, also an object of the present invention to modify a conventional EML transmitter in order to increase its output power while increasing the transmission distance of the signal generated by the EML transmitter. Since the key to the current invention is to modify the chirp of the output of the EML transmitter, this transmitter is sometimes referred to as a chirp-managed, electroabsorption-modulated (CM-EML) transmitter by Azna LLC/Finisar Corporation.

FIG. 23 shows a conventional (i.e., prior art) electroabsorption modulator, which comprises a DFB laser and an electroabsorption modulator. The DFB is biased with a constant bias to produce a constant power (CW) laser signal. This CW signal passes through the electroabsorption (EA) section, and is modulated by the EA section by applying an electrical data signal, for example at 10 Gb/s, to the EA section. Applying a voltage to the EA section modulates the optical transmission characteristics of the EA material, which is typically composed of multiple quantum wells (MQWs). The MQWs are designed to have an absorption peak near a wavelength of interest. The wavelength and magnitude of the absorption peak change by applying a voltage to the EA section, due to the quantum confined stark effect. A constant DC biasing voltage is applied to the EA section as well as the modulating data voltage signal. There is a transient chirp (or frequency deviation) associated with the change in absorption of the EA section at the transitions between the 1 and 0 bits. This transient frequency shift imparted on the modulated signal is a consequence of the Kramers Kronig relation, which dictates that there be an index change when the absorption of the material is changed. The DC bias of the EA determines both the throughput loss as well as the size of the transient chirp, i.e., the frequency excursion at the 1 to 0 and 0 to 1 transitions.

FIG. 24 shows the loss of a conventional EA modulator as a function of an applied DC voltage with and without data modulation. The EA is reverse-biased. Note that the loss of the EA section increases with increasing voltage. Note also that the loss is lower with modulation on, since the data voltage is modulated about the DC bias (i.e., the sum of the DC bias and data voltages is less than the DC bias alone). The differential loss is also shown in the graph of FIG. 24. Importantly, the output power of the EML transmitter is determined by the DC bias chosen for the EA section. An applied digital data voltage, with a peak-to-peak voltage=2.5 V, for example, representing 1 and 0 bits, generates an optical output signal with a certain ratio of 1 bit to 0 bits; this ratio is called the extinction ratio (ER). The ER is also a function of the DC bias, as well as the drive voltage of the digital signal.

As noted above, the DC bias determines the magnitude and sign of the transient chirp. Transient chirp, in turn, determines the bit error rate (BER) after transmission through fiber. To obtain an acceptable bit error rate (BER) after 80 km (1600 ps/nm), at 1550 nm, in a standard fiber, for example, the DC bias of the EA section is chosen to generate a negative chirp, which compresses the data pulses after propagation through positive dispersion fiber. Negative transient chirp is defined as chirp which is blue shifted for a 1 to 0 transition, and red shifted for a 0 to 1 transition.

This optimum loss associated with the DC bias that generates negative transient chirp for better transmission through standard fiber is usually high, leading to a low output power for a conventional EML.

FIG. 25 shows the intensity and temporal frequency profile, or chirp, of a conventional EA modulator. Note that, in this example, the EA and DFB sections are in separate packages. However, the results are representative of an EML transmitter in which the DFB and EA sections are integrated on the same chip. In this example, the transient chirp is optimum for transmission through standard single mode fiber, since the transient chirp is blue shifted on the 1 to 0 transitions and red shifted for the 0 to 1 transitions. In other words, negative transient chirp is provided, which causes the pulses to compress after transmission through standard fiber. The dispersion of standard single mode fiber is positive and typically ~17 ps/nm/km. Note that the bias voltage required to achieve a negative chirp leads to a relatively high loss; 13 dB in this example, which is undesirable.

For a conventional EML transmitter, reducing the bias voltage decreases the loss, as shown in FIG. 24, which can increase the output power of the EML transmitter. However, the chirp becomes positive at lower bias voltage. Positive transient chirp, defined as chirp which is blue shifted for 0 to 1 transitions and red shifted for 1 to 0 transitions, leads to pulse broadening after fiber transmission and increases the probability of errors. Thus, reducing the bias voltage in a conventional EML transmitter is generally not advantageous.

FIG. 26 shows the output intensity and chirp for an EA modulator, where the DC bias is lowered to reduce loss; DC bias=−1 V in this example. The loss of the modulator is reduced to 2 dB, however the chirp is positive; i.e. blue shifted at the 0 to 1 transitions. The bit error rate after fiber transmission at this lower DC bias level will therefore be worse than that for the higher DC bias level (see FIG. 25).

FIG. 27 shows the bit error rate of a conventional electroabsorption modulator transmitter after 100 km of standard single mode fiber (1700 ps/nm) as a function of bias of the electroabsorption modulator. The EA loss is also plotted on the same graph as a function of the bias voltage. Note that the BER decreases as the EA loss increases with bias voltage. This necessary compromise is the main cause of the low yield and therefore high cost of the conventional EML transmitter: good transmission performance necessarily means lower output power due to the higher loss at the optimum bias point.

It is, therefore, an objective of the present invention to provide a single chip transmitter solution that allows higher output power and better transmission performance compared to conventional EML transmitters.

The present invention provides a novel chirp-managed, electroabsorption-modulated laser, which provides higher output power and better transmission performance than conventional EML transmitters.

More particularly, in pending prior U.S. patent application Ser. No. 11/068,032, filed Feb. 28, 2005, which patent application is hereby incorporated herein by reference, there is disclosed a transmitter which is configured to simultaneously carry the same digital data in adiabatic chirp as well as amplitude modulation, and which has increased tolerance to fiber dispersion.

Looking now at FIG. 28, there is shown a preferred embodiment of the present invention, in which a digital data signal, and its logical inverse, are used to simultaneously modulate the laser and EA sections of an integrated electroabsorption modulator laser. In the present invention, there is disclosed the biasing conditions that optimize the output power as well as the transmission performance of the chirp-managed electroabsorption laser. Both the laser and electroabsorption sections are p-i-n diodes typically having multiple quantum wells in the un-doped i region; the laser is forward-biased; and the EA section is reverse-biased. The laser section has a DC current bias, $I_{DFBs}$, where the EA section has a negative DC voltage bias, $V_{EA}$, as described above. The optimum choice of $I_{DFB}$, and $V_{EA}$ are discussed below. In the preferred embodiment of the present invention, the DC bias of the laser and EA section are adjusted so as to produce a nearly zero or negative transient chirp at the output of the electroabsorption modulator.

In the preferred embodiment, a semiconductor laser, such as a distributed feed-back laser (DFB), is biased high above threshold and is directly modulated with a digital electrical data signal, D(t). In one example, the bias is 80 mA, which is 4-5 times the threshold current of the laser. This current modulation generates frequency modulation which follows the data signal for the most part; this is called adiabatic chirp. The amplitude of the data drive is adjusted so as to produce an adiabatic chirp which is approximately 50% of the bit rate frequency. For example, 5 GHz for a 10 Gb/s data signal. In practice, the adiabatic chirp has a working range of 30% to 70% of the bit rate, i.e., 3-7 GHz for 10 Gbps. The DFB output intensity is also modulated by the data signal and has the same logical polarity. The magnitude of this signal depends on the FM efficiency of the laser, but typically leads to a 1-2 dB extinction ratio. In this particular application, a laser with a higher FM efficiency is preferred, in order to produce a smaller amplitude modulation out of the DFB laser. The DFB output also has transient chirp at the 1 to 0 bit and 0 to 1 bit transitions. The magnitude of this transient chirp is determined by the relaxation oscillation frequency of the laser, $f_r$, which is known in the art to scale as the square root of the difference of the DC bias of the laser and the laser threshold current. The magnitude of the transient chirp is higher at lower laser bias since the relaxation oscillations that generate transient chirp are damped at high bias. Also, the damping frequency scales linearly with bias current. In this example, the DFB bias is between 50 mA to 80 mA. The sign of the transient chirp of a modulated DFB laser is positive; i.e., blue shift on the rising pulse edges (1→0) transitions and red shifted on the falling pulse edges (0→1) transitions, as shown in FIG. 29.

Modulating an EA modulator with the logical inverse of the data signal, $\overline{D}(t)$, generates an intensity modulation which has the opposite polarity to that of the DFB. Note that the data signal is a reverse-biased voltage: a higher negative voltage relative to the bias voltage increases EA absorption, decreases intensity and leads to 0 bits, while a lower negative voltage relative to the DC bias decreases absorption and leads to a lower loss 1 bits. The output intensity of a simultaneously modulated tandem laser/EA construction is the product of the output intensity of the laser and that of the EA, and is dominated by the output of the EA. By way of example but not limitation, the extinction ratio of the EA section is typically ~12 dB, while the DFB output has a 2 dB extinction ratio. The ER of the output is the difference between the ER of the EA and DFB; i.e., $ER=ER_{EA}-ER_{DFB}$~10 dB. As described above, the EA output intensity has an accompanying transient chirp with a sign that depends on the bias of the EA section.

In the preferred embodiment of the present invention, the bias of the EA section is chosen so as to generate a positive chirp, i.e., blue shift for 1→0 bit transitions and red shift for 0→1 bit transitions. Note that this sign of chirp is typically undesirable for a conventional EA, but is preferred here since the transient chirp of the DFB section can be adjusted to be greater than, or equal to, that of the EA, thereby causing the net transient chirp of the output of the tandem laser/EA construction to be near zero or negative. This can be seen in FIG. 29, where notably the intensity at the output of the tandem DFB laser/EA construction has the inverse polarity compared to that of the DFB laser alone, while the transient chirp has the same sign as that of the DFB laser. Hence, the 1→0 transitions will have red shift and 0→1 transitions will have blue shift; i.e., negative chirp. The DC bias of the EA in this case reduces the overall loss of the EA section and generates a higher output power compared to the conventional EML transmitter. Also, the negative net transient chirp causes pulse compression, which improves BER after positive dispersion fiber. Note that the adiabatic chirp is also a critical parameter of the present invention, as discussed above with respect to CML transmitters. A chirp of ~½ the bit rate frequency; e.g. 5 GHz for a 10 Gbps, causes the 1 bits separated by odd number of 0 bits to be π out of phase with each other. This phase shift causes the one bits to destructively interfere in the middle of the zero bits which separate them, thereby leading to a lower BER after transmission. The effect of adiabatic chirp is independent of the sign of the dispersion; either positive or negative dispersion fiber will produce destructive interference and improved BER performance.

FIG. 30 shows the intensity and chirp of a chirp-managed, electroabsorption modulated laser formed in accordance with the present invention, where the tandem DFB laser/EA construction are modulated and biased as described above. Note the negative transient chirp, as well as the adiabatic chirp, resulting from the DFB.

FIG. 31 shows the eye diagrams of a tandem DFB/EA construction, before and after transmission through 100 km of standard fiber (1700 ps/nm). The data rate was 11 Gb/s and the wavelength was 1550 nm. Note the high quality eye diagram. Here BT is a Bessel Thompson electrical filter placed after the receiver of the sampling scope, with 7.5 GHz BW, typically used to filter out high frequency and assess eye quality using measures such as mask margin. The mask margin is a standard square defined inside the eye diagram by the International Telecommunications Union (ITU), and is used to test eye quality against standards. The higher the mask margin, the higher the eye quality and the lower the BER at the transmitter output. Note the high 18% mask margin, indicating high eye quality and good back-to-back BER performance, as well as open eye diagram after 100 km of fiber.

FIG. 32 shows the BER of this chirp-managed, electroabsorption-modulated laser of the present invention for back-to-back (i.e., at the output of the transmitter, without fiber transmission) and after 100 km of fiber for different values of the extinction ratio. Error-free performance is achieved in all cases. Note that the optimum bias of the EA in this case was −1 V. At this EA bias level, the loss of the modulator was >10 dB higher than the case where the EA bias was optimized without the modulated DFB.

In another embodiment of the present invention, the DFB laser may be replaced by a directly-modulated tunable laser, a directly-modulated laser, or an FMV laser, such as a loss-modulated laser or a gain lever effect laser, which is known to generate FM with high efficiency. A variety of tunable lasers can be directly-modulated at high speed and generate frequency modulation including, for example, y branch sampled grating lasers, distributed Bragg reflector (DBR) lasers, sampled grating DBR lasers, external cavity lasers, ring resonator external cavity lasers and the like. The key ingredient of these lasers is that the laser is modulated to produce adiabatic and transient chirp as described above.

MODIFICATIONS

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. An optical transmitter comprising:
   an optical source modulated with an input digital data signal so as to generate a first, frequency-modulated digital signal; and
   an amplitude modulator, modulated with the logical inverse of the input digital data signal, for receiving the first, frequency-modulated signal and generating a second, amplitude-modulated and frequency-modulated digital signal;
   wherein the optical source and the amplitude modulator are each configured so as to produce positive transient chirp.

2. An optical transmitter according to claim 1 wherein the optical source is modulated by the input digital data signal such that, in the second, amplitude-modulated and frequency-modulated digital signal, the phase difference between two 1 bits separated by an odd number of 0 bits is an odd integer multiple of π.

3. An optical transmitter according to claim 1 wherein the optical source is modulated by the input digital data signal such that the adiabatic frequency excursion of the second, amplitude-modulated and frequency-modulated digital signal is between about 25% and about 75% of the bit rate frequency of the input digital data signal.

4. An optical transmitter according to claim 1 wherein the optical source is a semiconductor laser and the amplitude modulator is an electroabsorption modulator.

5. An optical transmitter according to claim 4 wherein the bias to the electroabsorption modulator is adjusted so as to generate positive transient chirp.

6. An optical transmitter according to claim 4 wherein the semiconductor laser is a distributed feedback (DFB) laser.

7. An optical transmitter according to claim 6 wherein the DFB laser and EA modulator are integrated on the same chip.

8. An optical transmitter according to claim 4 wherein the semiconductor laser is a distributed Bragg reflector laser.

9. An optical transmitter according to claim 1 wherein the optical source comprises one from the group consisting of: (i) y branch sampled grating lasers, (ii) sampled grating DBR lasers, (iii) external cavity lasers, and (iv) ring resonator external cavity lasers.

10. A method for transmitting a signal, the method comprising:
generating a first, frequency-modulated digital signal by modulating an optical source with an input digital data signal; and
providing a second, amplitude-modulated and frequency-modulated digital signal by passing the first, frequency-modulated digital signal through an amplitude modulator while modulating the amplitude modulator with the logical inverse of the input digital data signal;
wherein the optical source and the amplitude modulator are each configured so as to produce positive transient chirp.

11. A method according to claim 10 wherein the optical source is modulated by the input digital data signal such that, in the second, amplitude-modulated and frequency-modulated digital signal, the phase difference between two 1 bits separated by an odd number of 0 bits is an odd integer multiple of $\pi$.

12. A method according to claim 10 wherein the optical source is modulated by the input digital data signal such that the adiabatic frequency excursion of the second, amplitude-modulated and frequency-modulated digital signal is between about 25% and about 75% of the bit rate frequency of the input digital data signal.

13. A method according to claim 10 wherein the optical source is a semiconductor laser and the amplitude modulator is an electroabsorption modulator.

14. A method according to claim 13 wherein the bias to the electroabsorption modulator is adjusted so as to generate positive transient chirp.

15. A method according to claim 13 wherein the semiconductor laser is a distributed feedback (DFB) laser.

16. A method according to claim 15 wherein the DFB laser and EA modulator are integrated on the same chip.

17. A method according to claim 15 wherein the semiconductor laser is a distributed Bragg reflector laser.

18. A method according to claim 10 wherein the optical source comprises one from the group consisting of: (i) y branch sampled grating lasers, (ii) sampled grating DBR lasers, (iii) external cavity lasers, and (iv) ring resonator external cavity lasers.

* * * * *